(12) United States Patent
Furukawa et al.

(10) Patent No.: US 10,788,319 B2
(45) Date of Patent: Sep. 29, 2020

(54) ANGLE DETECTION DEVICE

(71) Applicant: Mitsubishi Electric Corporation, Tokyo (JP)

(72) Inventors: Akira Furukawa, Tokyo (JP); Wataru Ozaki, Tokyo (JP); Yu Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 221 days.

(21) Appl. No.: 15/754,114

(22) PCT Filed: Oct. 3, 2016

(86) PCT No.: PCT/JP2016/079354
§ 371 (c)(1),
(2) Date: Feb. 21, 2018

(87) PCT Pub. No.: WO2017/068952
PCT Pub. Date: Apr. 27, 2017

(65) Prior Publication Data
US 2018/0245914 A1    Aug. 30, 2018

(30) Foreign Application Priority Data

Oct. 22, 2015 (WO) .................. PCT/JP2015/079829

(51) Int. Cl.
*G01B 21/22* (2006.01)
*G01D 5/244* (2006.01)
(Continued)

(52) U.S. Cl.
CPC .............. *G01B 21/22* (2013.01); *G01D 5/14* (2013.01); *G01D 5/20* (2013.01); *G01D 5/244* (2013.01);
(Continued)

(58) Field of Classification Search
None
See application file for complete search history.

(56) References Cited

U.S. PATENT DOCUMENTS

| 4,046,341 A | * | 9/1977 | Quinlivan | ............ | G05D 1/0825 |
| | | | | | 244/181 |
| 4,119,958 A | * | 10/1978 | Simon | .................. | H03M 1/485 |
| | | | | | 318/604 |

(Continued)

FOREIGN PATENT DOCUMENTS

| JP | 3-056817 A | 3/1991 |
| JP | 2007-304000 A | 11/2007 |

(Continued)

OTHER PUBLICATIONS

International Search Report of PCT/JP2016/079354 dated Dec. 20, 2016 [PCT/ISA/210].

*Primary Examiner* — Tung S Lau
(74) *Attorney, Agent, or Firm* — Sughrue Mion, PLLC; Richard C. Turner

(57) ABSTRACT

Provided is an angle detection device including: a correction signal calculator configured to generate corrected signals from a sine signal and a cosine signal acquired from an angle detector; and an angle calculator configured to calculate an angle signal for a rotary machine from the corrected signals. When one of the sine signal and the cosine signal is defined as a first detection signal, and another one thereof is defined as a second detection signal, the correction signal calculator calculates a corrected first detection signal and a corrected second detection signal, and the angle calculator calculates the angle signal for the rotary machine from the corrected first detection signal and the corrected second detection signal.

21 Claims, 20 Drawing Sheets

(51) Int. Cl.
 G01D 5/20 (2006.01)
 G01D 5/14 (2006.01)
(52) U.S. Cl.
 CPC ....... G01D 5/2448 (2013.01); G01D 5/24471 (2013.01); G01D 5/24476 (2013.01)

(56) References Cited

U.S. PATENT DOCUMENTS

| | | | | |
|---|---|---|---|---|
| 4,870,588 | A | * | 9/1989 | Merhav ............ G01P 9/00 701/502 |
| 5,079,500 | A | * | 1/1992 | Oswald ............ G01R 17/20 323/298 |
| 2003/0041661 | A1 | * | 3/2003 | Van Steenwyk ...... E21B 47/022 73/152.03 |
| 2008/0158026 | A1 | * | 7/2008 | O'Brien ............ G01R 31/2834 341/94 |
| 2009/0301221 | A1 | * | 12/2009 | Andersson ............ G01M 17/10 73/862.041 |
| 2011/0227767 | A1 | * | 9/2011 | O'Brien ............ G01D 5/24452 341/118 |
| 2013/0249452 | A1 | * | 9/2013 | Shinohara ............ G01D 5/2073 318/400.04 |
| 2014/0316733 | A1 | * | 10/2014 | Mori ............ G01D 5/00 702/94 |
| 2017/0126153 | A1 | * | 5/2017 | Lepka ............ H02P 6/18 |

FOREIGN PATENT DOCUMENTS

| | | | | |
|---|---|---|---|---|
| JP | 2007304000 A | * | 11/2007 | ............ G01B 7/30 |
| JP | 2008-273478 A | | 11/2008 | |
| JP | 4481137 B2 | | 6/2010 | |
| WO | WO 2017/068952 | * | 10/2013 | ............ G01B 21/22 |

* cited by examiner

FIG. 19

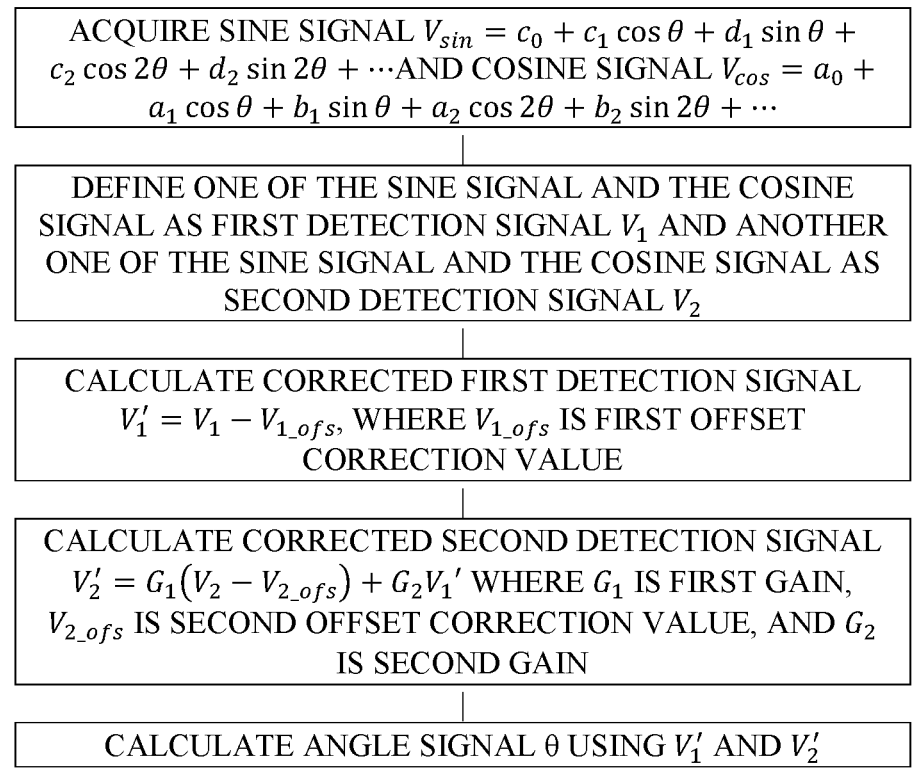

ACQUIRE SINE SIGNAL $V_{sin} = c_0 + c_1 \cos\theta + d_1 \sin\theta + c_2 \cos 2\theta + d_2 \sin 2\theta + \cdots$ AND COSINE SIGNAL $V_{cos} = a_0 + a_1 \cos\theta + b_1 \sin\theta + a_2 \cos 2\theta + b_2 \sin 2\theta + \cdots$ DEFINE ONE OF THE SINE SIGNAL AND THE COSINE SIGNAL AS FIRST DETECTION SIGNAL $V_1$ AND ANOTHER ONE OF THE SINE SIGNAL AND THE COSINE SIGNAL AS SECOND DETECTION SIGNAL $V_2$ CALCULATE CORRECTED FIRST DETECTION SIGNAL $V_1' = V_1 - V_{1\_ofs}$, WHERE $V_{1\_ofs}$ IS FIRST OFFSET CORRECTION VALUE CALCULATE CORRECTED SECOND DETECTION SIGNAL $V_2' = G_1(V_2 - V_{2\_ofs}) + G_2 V_1'$ WHERE $G_1$ IS FIRST GAIN, $V_{2\_ofs}$ IS SECOND OFFSET CORRECTION VALUE, AND $G_2$ IS SECOND GAIN CALCULATE ANGLE SIGNAL $\theta$ USING $V_1'$ AND $V_2'$

FIG. 20

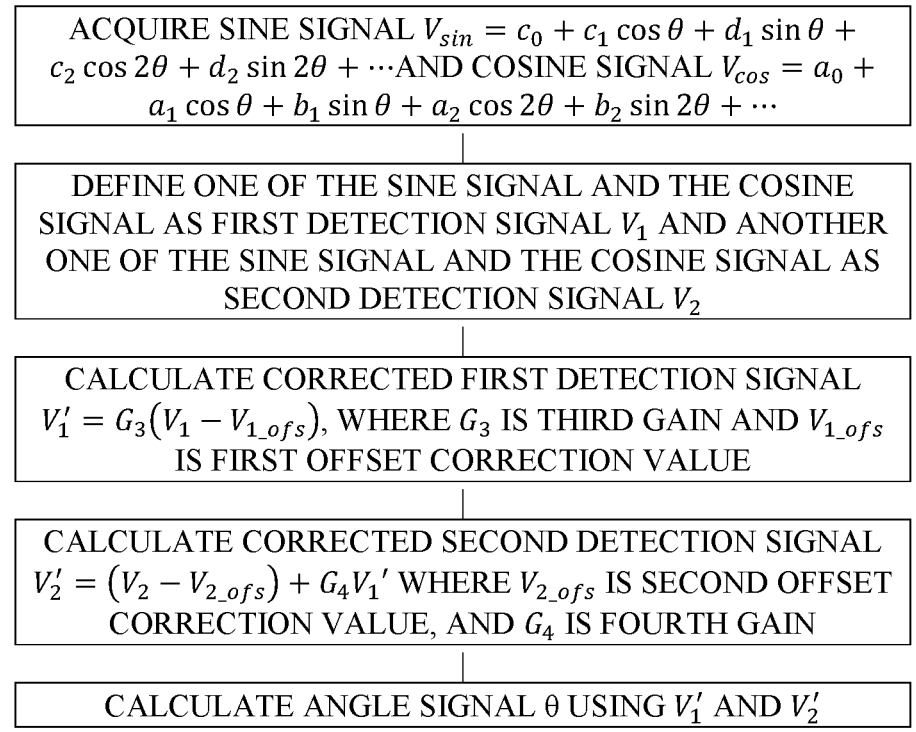

ACQUIRE SINE SIGNAL $V_{sin} = c_0 + c_1 \cos\theta + d_1 \sin\theta + c_2 \cos 2\theta + d_2 \sin 2\theta + \cdots$ AND COSINE SIGNAL $V_{cos} = a_0 + a_1 \cos\theta + b_1 \sin\theta + a_2 \cos 2\theta + b_2 \sin 2\theta + \cdots$ DEFINE ONE OF THE SINE SIGNAL AND THE COSINE SIGNAL AS FIRST DETECTION SIGNAL $V_1$ AND ANOTHER ONE OF THE SINE SIGNAL AND THE COSINE SIGNAL AS SECOND DETECTION SIGNAL $V_2$ CALCULATE CORRECTED FIRST DETECTION SIGNAL $V_1' = G_3(V_1 - V_{1\_ofs})$, WHERE $G_3$ IS THIRD GAIN AND $V_{1\_ofs}$ IS FIRST OFFSET CORRECTION VALUE CALCULATE CORRECTED SECOND DETECTION SIGNAL $V_2' = (V_2 - V_{2\_ofs}) + G_4 V_1'$ WHERE $V_{2\_ofs}$ IS SECOND OFFSET CORRECTION VALUE, AND $G_4$ IS FOURTH GAIN CALCULATE ANGLE SIGNAL $\theta$ USING $V_1'$ AND $V_2'$

ANGLE DETECTION DEVICE

CROSS REFERENCE TO RELATED APPLICATIONS

This application is a National Stage of International Application No. PCT/JP2016/079354, filed Oct. 3, 2016, claiming priority based on International Patent Application No. PCT/JP2015/079829, filed Oct. 22, 2015.

TECHNICAL FIELD

The present invention relates to an angle detection device for decreasing an angle detection error.

BACKGROUND ART

An increase in detection precision of a rotation position of a rotor is required in order to provide a motor decreased in torque ripple. There is thus known a related-art power steering control device, which is configured to use middle point correction values of a sine signal and a cosine signal of a resolver stored in advance in an EEPROM or the like to correct detection signals, to thereby decrease an angle error of rotation 1st order generated by a signal error of rotation 0th order (for example, refer to Patent Literature 1).

In Patent Literature 1, the sine signal and the cosine signal to which the middle point correction is applied are corrected by multiplying the signals by amplitude correction coefficients stored in advance in an EEPROM or the like, to thereby decrease angle errors of rotation 2nd order generated by signal errors of rotation 1st order.

Moreover, there is known a related-art technology of using signals acquired from three or four rotation detectors arranged at intervals of 90 degrees to remove angle errors of rotation 1st order generated by eccentricity (for example, refer to Patent Literature 2).

In Patent Literature 2, signals input from two rotation detectors arranged at an interval of 90 degrees are added to each other, or one of signals input from two rotation detector arranged at an interval of 180 degrees is subtracted from another one of the signals, to thereby remove angle errors of rotation 2nd order generated by deformation into an ellipsoidal shape.

CITATION LIST

Patent Literature

[PTL 1] JP 2008-273478 A
[PTL 2] JP 4481137 B2

SUMMARY OF INVENTION

Technical Problem

However, the related art has the following problems.

With the detection method of Patent Literature 1, angle errors of rotation 1st order generated by offset errors contained in the sine signal and the cosine signal or angle errors of rotation 2nd order generated by an amplitude ratio can be decreased. However, there is such a problem that angle errors of rotation 2nd order, which are caused by a signal error of rotation 3rd order generated by a positional displacement of the rotation sensor, cannot be decreased.

Moreover, with the detection method of Patent Literature 2, the three or four rotation detectors are used to enable a decrease in the angle errors of rotation 1st order or 2nd order generated by the eccentricity or the deformation into the ellipsoidal shape. However, the plurality of rotation detectors are necessary, and there is thus such a problem that a cost of the structure is high.

The present invention has been made in view of the above-mentioned problems, and therefore has an object to provide an angle detection device capable of decreasing angle errors including a 2nd order component of rotation without causing an increase in cost.

Solution to Problem

According to one embodiment of the present invention, there is provided an angle detection device including: a correction signal calculator, which is configured to generate corrected signals from a sine signal and a cosine signal, which are acquired from an angle detector; and an angle calculator, which is configured to calculate an angle signal for a rotary machine from the corrected signals generated by the correction signal calculator, in which: the correction signal calculator is configured to: when one of the sine signal and the cosine signal is defined as a first detection signal, and another one of the sine signal and the cosine signal is defined as a second detection signal, subtract, from the first detection signal, a sum of at least one of a first offset correction value $X_0$, $X_1$ to $X_n$, which are obtained by multiplying 1st to n-th powers of the first detection signal by $K_{11}$ to $K_{1n}$, respectively, where n is a natural number, and $X_{n+1}$ to $X_{2n}$, which are obtained by multiplying 1st to n-th powers of the second detection signal by $K_{21}$ to $K_{2n}$, respectively, to thereby calculate a corrected first detection signal; and subtract, from the second detection signal, a sum of at least one of a second offset correction value $Y_0$, $Y_1$ to $Y_n$, which are obtained by multiplying 1st to n-th powers of the first detection signal by $G_{11}$ to $G_{1n}$, respectively, and $Y_{n+1}$ to $Y_{2n}$, which are obtained by multiplying 1st to n-th powers of the second detection signal by $G_{21}$ to $G_{2n}$, respectively, to thereby calculate a corrected second detection signal; and the angle calculator is configured to calculate the angle signal for the rotary machine from the corrected first detection signal and the corrected second detection signal, to thereby decrease errors in 1st order to (n+1)th order components contained in the angle signal.

Further, according to one embodiment of the present invention, there is provided an angle detection device including: a correction signal calculator, which is configured to generate corrected signals from a sine signal and a cosine signal, which are acquired from an angle detector; and an angle calculator, which is configured to calculate an angle signal for a rotary machine from the corrected signals generated by the correction signal calculator, in which: the correction signal calculator is configured to, when the cosine signal $V_{cos}$ is set as: $V_{cos}=a_0+a_1\cos\theta+b_1\sin\theta+a_2\cos 2\theta+b_2\sin 2\theta\ldots$, the sine signal $V_{sin}$ is set as: $V_{sin}=c_0+c_1\cos\theta+d_1\sin\theta+c_2\cos 2\theta+d_2\sin 2\theta\ldots$, and one of the sine signal and the cosine signal is defined as a first detection signal, and another one of the sine signal and the cosine signal is defined as a second detection signal: subtract a first offset correction value from the first detection signal, to thereby calculate a corrected first detection signal; and add a result of multiplication of the corrected first detection signal by a second gain to a result of multiplication of a result of subtraction of a second offset correction value from the second detection signal by a first gain, to thereby calculate a corrected second detection signal; and the angle calculator is configured to calculate the angle signal for the rotary machine from the corrected first detection signal and the corrected second detection signal, to thereby decrease 1st order and 2nd order angle errors generated from errors in 0th order to 3rd order components contained in the sine signal or the cosine signal.

Further, according to one embodiment of the present invention, there is provided an angle detection device including: a correction signal calculator, which is configured to generate corrected signals from a sine signal and a cosine signal, which are acquired from an angle detector; and an angle calculator, which is configured to calculate an angle signal for a rotary machine from the corrected signals generated by the correction signal calculator, in which: the correction signal calculator is configured to, when the cosine signal $V_{cos}$ is set as: $V_{cos}=a_0+a_1 \cos \theta+b_1 \sin \theta+a_2 \cos 2\theta+b_2 \sin 2\theta \ldots$, the sine signal $V_{sin}$ is set as: $V_{sin}=c_0+c_1 \cos \theta+d_1 \sin \theta+c_2 \cos 2\theta+d_2 \sin 2\theta \ldots$, and one of the sine signal and the cosine signal is defined as a first detection signal, and another one of the sine signal and the cosine signal is defined as a second detection signal: subtract a first offset correction value from the first detection signal and multiply a result of the subtraction by a third gain, to thereby calculate a corrected first detection signal; and add a result of multiplication of the corrected first detection signal by a fourth gain to a result of subtraction of a second offset correction value from the second detection signal, to thereby calculate a corrected second detection signal; and the angle calculator is configured to calculate the angle signal for the rotary machine from the corrected first detection signal and the corrected second detection signal, to thereby decrease 1st order and 2nd order angle errors generated from errors in 0th order to 3rd order components contained in the sine signal or the cosine signal.

Advantageous Effects of Invention

According to the present invention, the corrected signals generated from the sine signal and the cosine signal acquired from the angle detector are used to calculate the angle. As a result, it is possible to provide the angle detection device capable of decreasing the angle errors including the 2nd order component of rotation without causing the increase in cost.

BRIEF DESCRIPTION OF DRAWINGS

FIG. 19 is a diagram for illustrating an operation performed by the angle detection device according to an embodiment.

FIG. 20 is a diagram for illustrating an operation performed by the angle detection device according to an embodiment.

Referring to the accompanying drawings, an angle detection device according to each embodiment of the present invention is described in detail below. In the drawings, the same or corresponding components and parts are denoted by the same reference symbols.

First Embodiment

As an angle detector 1 used for an angle detection device according to the present invention, a resolver, a sensor that uses a magnetic resistance device (hereinafter referred to as MR sensor), an encoder, a Hall element, and the like can be given. The same effect is provided through use of any one of the detectors, and a description is thus given of the MR sensor as an example.

Figure 1:
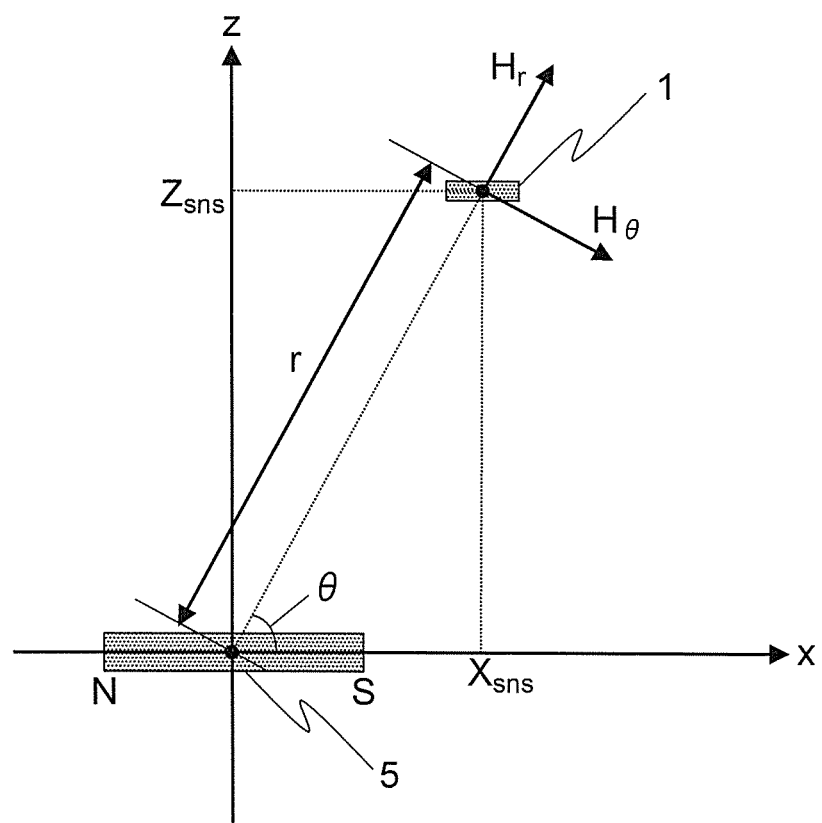
FIG. 1 is a schematic diagram for illustrating a positional relationship between an angle detector and a sensor magnet as an XZ plane in the first embodiment of the present invention.

FIG. 1 is a schematic diagram for illustrating a positional relationship between an angle detector 1 and a sensor magnet 5 as an XZ plane in the first embodiment of the present invention. A direction perpendicular to the XZ plane and from the front to the back of the drawing sheet is a Y axis. The angle detector 1 detects magnetic fields generated by the sensor magnet 5 to output a sine signal $V_{sin}$ and a cosine signal $V_{cos}$.

A magnetic field $H_r$ and a magnetic field $H_\theta$ generated by the sensor magnet 5 are given by Expression (1), where a magnetic dipole moment is represented by m, and a magnetic permeability of the vacuum is represented by $$\begin{cases} H_r = \dfrac{2m \cos \theta}{4\pi\mu_0 r^3} \\ H_\theta = \dfrac{m \sin \theta}{4\pi\mu_0 r^3} \end{cases} \quad (1)$$

The sensor magnet 5 rotates together with a rotor, and hence the magnetic fields generated by the sensor magnet 5 to be detected by the angle detector 1 change in accordance with the angle.

When the angle detector 1 exists at a position where θ is 90 degrees, and a center axis of the sensor magnet 5 and a Z axis are not displaced from each other, the magnetic field $H_r$ and the magnetic field $H_\theta$ are given by Expression (2).

$$\begin{cases} H_r = 0 \\ H_\theta = \dfrac{m}{4\pi\mu_0 r^3} \end{cases} \quad (2)$$

In other words, in this case, the magnetic field $H_r$ and the magnetic field $H_\theta$ are magnetic field vectors having the same magnitude and different directions on the XY plane, and an angle error generated by a positional displacement of the angle detector 1 is ideally zero.

Meanwhile, when the center axis of the sensor magnet 5 and the Z axis are displaced from each other due to constraint imposed by manufacturing or manufacturing variation, the magnetic fields of X and Y direction components are fundamental wave components superimposed with error components. Thus, a magnetic field vector $h_{all}$ is given by Expression (3) as individual X, Y, and Z-direction components.

$$h_{all} = \frac{m}{4\pi\mu_0 r^3} \left\{ \begin{pmatrix} \cos\theta_m \\ \sin\theta_m \\ 0 \end{pmatrix} + \left( \frac{x_{sns}}{r}\cos\theta_m + \frac{y_{sns}}{r}\sin\theta_m \right) \begin{pmatrix} \frac{x_{sns}}{r} \\ \frac{y_{sns}}{r} \\ \frac{z_{sns}}{r} \end{pmatrix} \right\} \quad (3)$$

Moreover, the angle detector 1 is often used under a state saturated in a main component vector direction of a magnetic field. In this case, an error component appeared in a normal line direction component of the main component vector can actually be detected. For example, when the X direction component is detected as a cosine signal $V_{cos}$, and the Y direction component is detected as a sine component $V_{sin}$, the respective signals are given by Expression (4).

$$\begin{pmatrix} V_{cos} \\ V_{sin} \end{pmatrix} = K_1 \begin{pmatrix} \cos\theta_m \\ \sin\theta_m \end{pmatrix} + K_2 \begin{pmatrix} \sin(\theta_m - \frac{\pi}{2} + \xi) + \sin(3\theta_m + \frac{\pi}{2} + \xi) \\ \sin(\theta_m + \xi) + \sin(3\theta_m + \xi) \end{pmatrix} \quad (4)$$

When the detection signals containing signal errors of 1st order rotation and 3rd order rotation as given by Expression (4) are used to calculate the angle, an angle error ε is given by a 2nd order component of rotation as Expression (5).

$$\varepsilon = \frac{2K_2}{K_1} \sin(2\theta_m + \xi) \quad (5)$$

Moreover, even when the sensor magnet 5 rotates about a positional displaced from the Z axis, the calculation can be carried out in the same way, and the cosine signal $V_{cos}$ and the sine signal $V_{sin}$ are given by Expression (6).

$$\begin{pmatrix} V_{cos} \\ V_{sin} \end{pmatrix} = L_1 \begin{pmatrix} \cos\theta_m \\ \sin\theta_m \end{pmatrix} + L_2 \begin{pmatrix} \sin(\xi_1 - \frac{\pi}{2}) + \sin(2\theta_m + \xi_1 + \frac{\pi}{2}) \\ \sin(\xi_1) + \sin(2\theta_m + \xi_1) \end{pmatrix} + \quad (6)$$

$$L_3 \begin{pmatrix} \sin(\theta_m + \xi_2 - \frac{\pi}{2}) + \sin(3\theta_m + \xi_2 + \frac{\pi}{2}) \\ \sin(\theta_m + \xi_2) + \sin(3\theta_m + \xi_2) \end{pmatrix}$$

When the detection signals containing signal errors of 0th order rotation, 1st order rotation, 2nd order rotation, and 3rd order rotation as given by Expression (6) are used to calculate the angle, the angle error ε is given by components of the 1st order rotation and the 2nd order rotation as Expression (7).

$$\varepsilon = \frac{2L_2}{L_1}\sin(\theta_m + \xi_1) + \frac{2L_3}{L_1}\sin(2\theta_m + \xi_2) \quad (7)$$

In other words, it can be found that, when the angle detector 1 or the sensor magnet 5 is displaced from the rotation axis, the detection signals containing the signal errors of the 0th order rotation to 3rd order rotation are obtained, and the angle error of 1st order rotation or 2nd order rotation is consequently generated.

Figure 2:
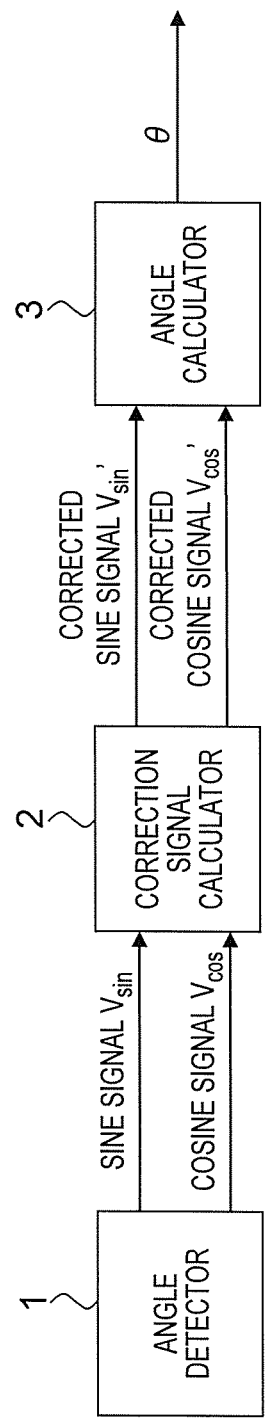
FIG. 2 is a block diagram for illustrating a configuration of an angle detection device according to the first embodiment of the present invention.

Therefore, the angle detection device according to the present invention decreases the angle errors generated by the signal errors through control blocks configured as illustrated in FIG. 2. FIG. 2 is a block diagram for illustrating the configuration of the angle detection device according to the first embodiment of the present invention. The angle detection device according to the first embodiment illustrated in FIG. 2 includes the angle detector 1, a correction signal calculator 2, and an angle calculator 3.

The angle detector 1 is configured to output the sine signal $V_{sin}$ and the cosine signal $V_{cos}$ in accordance with the angle of the rotor. The correction signal calculator is configured to correct the sine signal $V_{sin}$ and the cosine signal $V_{cos}$ obtained by the angle detector 1 through a method described later to output a corrected sine signal $V_{sin}'$ and a corrected cosine signal $V_{cos}'$.

The angle calculator 3 is configured to use the corrected sine signal $V_{sin}'$ and the corrected cosine signal $V_{cos}'$ obtained by the correction signal calculator 2 to calculate an angle θ in accordance with, for example, Expression (8).

$$\theta = \tan^{-1}\left(\frac{V\sin'}{V\cos'}\right) \quad (8)$$

On this occasion, such a numerical expression as Expression (8) is used to calculate the angle θ, but a conversion table defined in advance may be used to calculate the angle θ.

A description is now given of the correction method used by the correction signal calculator 2 in a case where the cosine signal is defined as a first detection signal, and the sine signal is defined as a second detection signal. Correction coefficients determined through the same approach may be used even in a case where the sine signal is defined as the first detection signal and the cosine signal is defined as the second detection signal, and the same effect is provided in this case.

For example, when the cosine signal $V_{cos}$ and the sine signal $V_{sin}$ are expressed as Expression (6), the respective signals are given by Expression (9).

$$\begin{cases} V_{cos} = a_0 + a_1\cos\theta + b_1\sin\theta + a_2\cos2\theta + b_2\sin2\theta + a_3\cos3\theta + b_3\sin3\theta \\ V_{sin} = c_0 + c_1\cos\theta + d_1\sin\theta + c_2\cos2\theta + d_2\sin2\theta + c_3\cos3\theta + d_3\sin3\theta \end{cases} \quad (9)$$

The cosine signal $V_{cos}$ and the sine signal $V_{sin}$ in an ideal state contain components as given by Expression (10).

$$\begin{cases} V_{cos} = a_1\cos\theta \\ V_{sin} = a_1\sin\theta \end{cases} \quad (10)$$

Thus, components of Expression (9) other than the components of Expression (10) are error components.

Figure 3:
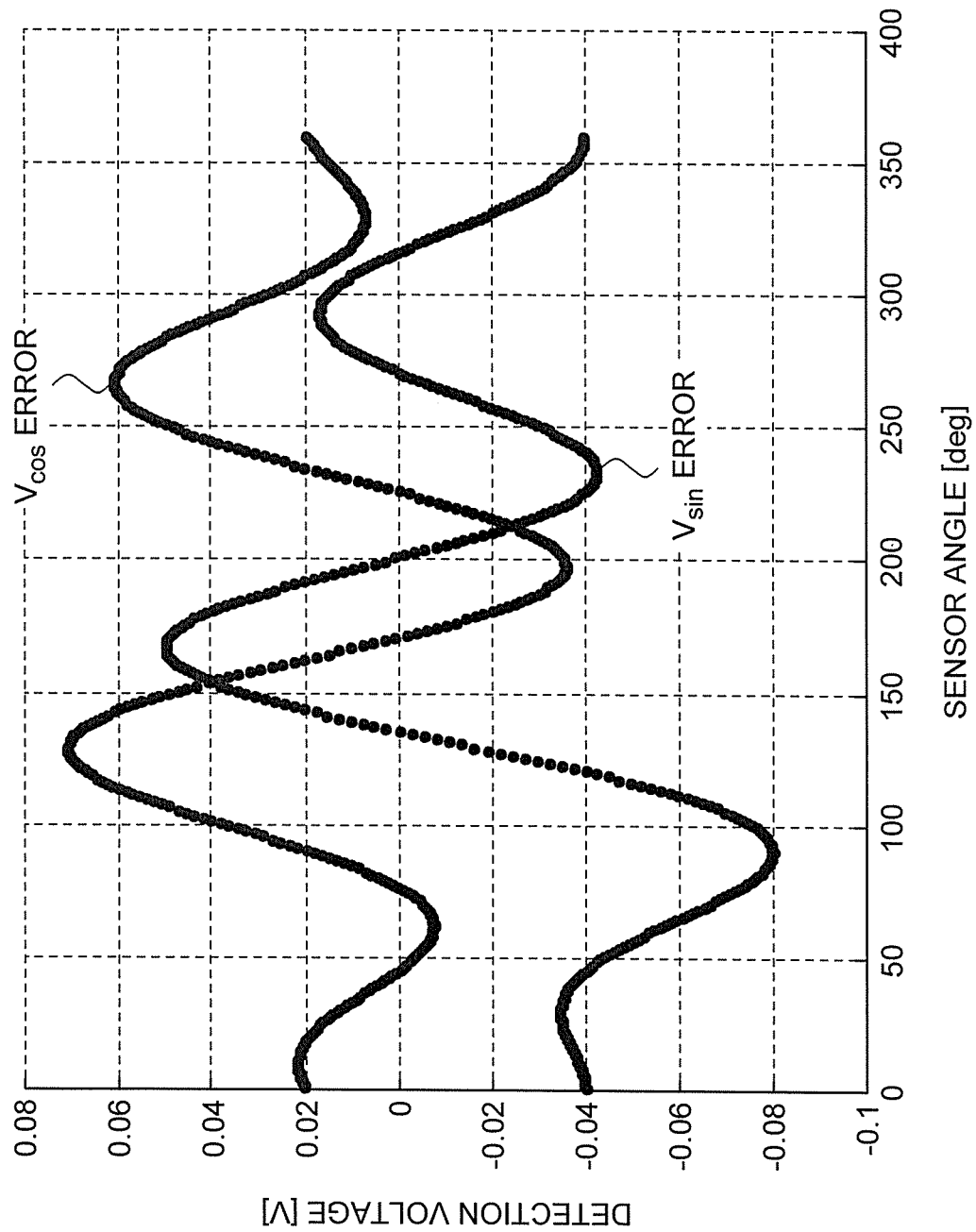
FIG. 3 is a graph for showing an example of error components contained in respective signals when appropriate values are assigned to respective coefficients a0 to a3, b1 to b3, c0 to c3, and d1 to d3 of Expression (10).

FIG. 3 is a graph for showing an example of error components contained in the respective signals when appropriate values are assigned to respective coefficients $a_0$ to $a_3$, $b_1$ to $b_3$, $c_0$ to $c_3$, and $d_1$ to $d_3$ of Expression (10). As shown in FIG. 3, the errors of a 0th order rotation to a 3rd order rotation are superimposed on the signals indicated as "$V_{cos}$ error" and "$V_{sin}$ error".

Figure 4:
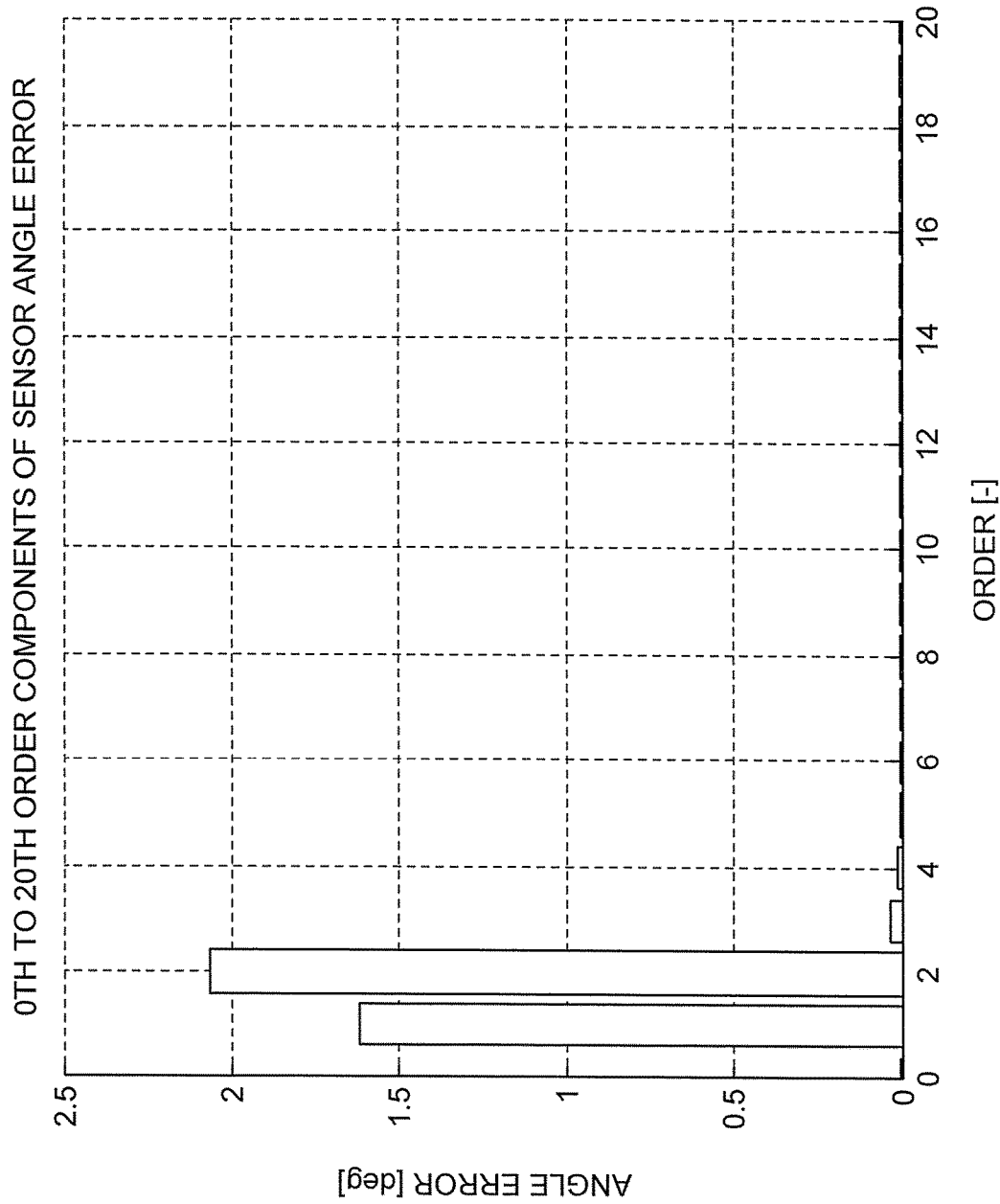
FIG. 4 is a graph for showing angle errors remaining after angle errors of rotation 1st order generated by offset errors and angle errors of rotation 2nd order generated by an amplitude ratio of the two signals, both of which are contained in the respective signals of FIG. 3, are corrected through a method of Patent Literature 1.

FIG. 4 is a graph for showing angle errors remaining after the angle errors of the 1st order rotation generated by offset errors and the angle errors of the 2nd order rotation generated by an amplitude ratio of the two signals, both of which are contained in the respective signals of FIG. 3, are corrected through a method of Patent Literature 1.

The method of Patent Literature 1 cannot decrease angle errors generated by the error components of the 2nd order rotation and the 3rd order rotation other than the offset errors and the amplitude ratio displacement. Therefore, as shown in FIG. 4, with the method of Patent Literature 1, the angle errors of the 1st order rotation and the 2nd order rotation remain as large values.

The error components are sufficiently smaller than the fundamental wave components, and a relationship given by Expression (11) thus holds true for the respective coefficients of Expression (9).

$$a_0, a_2, a_3, b_1, b_2, b_3, c_0, c_1, c_2, c_3, d_2, d_3 << a_1, d_1 \quad (11)$$

Moreover, a difference in the amplitude between the cosine signal $V_{cos}$ and the sine signal $V_{sin}$ is sufficiently smaller than the fundamental wave amplitudes, and Expression (12) thus holds true.

$$|d_1 - a_1| << a_1, d_1 \quad (12)$$

From a relationship between Expression (11) and Expression (12), products of correction coefficients $k_{c0}$ to $k_{c3}$ and $k_{s0}$ to $k_{s3}$ sufficiently smaller than 1 and powers of the signals can be approximated as Expression (13). In Expression (13), the approximation is made based on an assumption that the products of the minute coefficients $a_0$, $a_2$, $a_3$, $b_1$, $b_2$, $b_3$, $c_0$, $c_1$, $c_2$, $c_3$, $d_2$, and $d_3$, and the correction coefficients $k_{c0}$ to $k_{c3}$ and $k_{s0}$ to $k_{s3}$ are negligible, but approximate expression are not limited to Expression (13), and it should be understood that the same effect can be provided by other approximation, for example, such approximation that a product of three minute coefficients is considered to be negligible.

$$\begin{cases} k_{c1}\dfrac{V_{cos}}{d_1} \approx k_{c1}\cos\theta \\ k_{c2}\dfrac{V_{cos}^2}{d_1^2} \approx \dfrac{k_{c2}}{2} + \dfrac{k_{c2}}{2}\cos2\theta \\ k_{c3}\dfrac{V_{cos}^3}{d_1^3} \approx \dfrac{3}{4}k_{c3}\cos\theta + \dfrac{k_{c3}}{4}\cos3\theta \\ k_{s1}\dfrac{V_{sin}}{d_1} \approx k_{s1}\sin\theta \\ k_{s2}\dfrac{V_{sin}^2}{d_1^2} \approx \dfrac{k_{s2}}{2} - \dfrac{k_{s2}}{2}\cos2\theta \\ k_{s3}\dfrac{V_{sin}^3}{d_1^3} \approx \dfrac{3}{4}k_{s3}\sin\theta - \dfrac{k_{s3}}{4}\sin3\theta \end{cases} \quad (13)$$

From Expression (9) and Expression (13), for example, the corrected sine signal $V_{sin}'$ and the corrected cosine signal $V_{cos}'$ are given by Expression (14).

$$\begin{cases} V_{cos}' = V_{cos} - k_{c0} - \dfrac{k_{c1}}{d_1} V_{cos} - \dfrac{k_{c3}}{d_1^3} V_{cos}^3 - \dfrac{k_{s1}}{d_1} V_{sin} - \dfrac{k_{s2}}{d_1^2} V_{sin}^2 - \dfrac{k_{s3}}{d_1^3} V_{sin}^3 \\ V_{sin}' = V_{sin} - k_{s0} - \dfrac{k_{c2}}{d_1^2} V_{cos}^2 \end{cases} \quad (14)$$

Expressions for calculating the respective signals are not limited to Expression (14). It should be understood that other correction expressions provide the same effect as long as the expression is defined as a sum of the powers of the sine signal $V_{sin}$ or the cosine signal $V_{cos}$ multiplied by gains.

The angle error ε generated by the corrected sine signal $V_{sin}'$ and the corrected cosine signal $V_{cos}'$ is given by Expression (15).

$$\varepsilon \approx \frac{1}{2d}\Bigg[\left\{-\left(b_1 - k_{s1} - \frac{3}{4}k_{s3}\right) + c_1\right\} + \qquad (15)$$
$$\left\{-b_2 + \left(c_2 - \frac{k_{c2}}{2}\right) + 2\left(c_0 - k_{s0} - \frac{k_{c2}}{2}\right)\right\}\cos\theta +$$
$$\left\{-2\left(a_0 - k_{c0} - \frac{k_{s2}}{2}\right) + \left(a_2 + \frac{k_{s2}}{2}\right) + d_2\right\}\sin\theta +$$
$$\left\{\left(b_1 - k_{s1} - \frac{3}{4}k_{s3}\right) - \left(b_3 + \frac{k_{s3}}{4}\right) + c_1 + c_3\right\}\cos2\theta +$$
$$\left\{-\left(a_1 - k_{c1} - \frac{3}{4}k_{c3}\right) + \left(a_3 - \frac{k_{c3}}{4}\right) + d_1 + d_3\right\}\sin2\theta +$$
$$\left(b_2 + c_2 - \frac{k_{c2}}{2}\right)\cos3\theta + \left\{-\left(a_2 + \frac{k_{s2}}{2}\right) + d_2\right\}\sin3\theta +$$
$$\left\{\left(b_3 + \frac{k_{s3}}{4}\right) + c_3\right\}\cos4\theta + \left\{-\left(a_3 - \frac{k_{c3}}{4}\right) + d_3\right\}\sin4\theta\Bigg]$$

In other words, when the correction coefficients $k_{c0}$ to $k_{c3}$ and $k_{s0}$ to $k_{s3}$ are given by Expression (16) so that the coefficients of the 1st order to 4th order cosine functions and sine functions become 0, the angle errors of the 1st order rotation to the 4th order rotation can be decreased.

$$\begin{cases} k_{c0} = a_0 + a_2 - 2d_2 \\ k_{s0} = -2b_2 + c_0 - c_2 \\ k_{c1} = a_1 - 3a_3 - d_1 + d_3 \\ k_{s1} = b_1 + 3b_3 + c_1 + 5c_3 \\ k_{c2} = 2b_2 + 2c_2 \\ k_{s2} = -2a_2 + 2d_2 \\ k_{c3} = 4a_3 - 4d_3 \\ k_{s3} = -4b_3 - 4c_3 \end{cases} \quad (16)$$

A first offset correction value $X_0$ only needs to be calculated by adding and subtracting coefficients of 2m-th order (m is an integer of 0 or more) of the Fourier series expansions of the first detection signal and the second detection signal.

Similarly, a second offset correction value $Y_0$ only needs to be calculated by adding and subtracting coefficients of 2m-th order of the Fourier series expansions of the first detection signal and the second detection signal.

A gain $G_{1kx}$ by which kx-th (kx is an odd number of 1 or more) power of the first detection signal is multiplied only needs to be calculated by dividing a value obtained by adding and subtracting coefficients of (2m+1)th order of the Fourier series expansions of the first detection signal and the second detection signal by a kx-th power of the fundamental wave amplitude. A gain $G_{1ky}$ by which ky-th (ky is an even number of 1 or more) power of the first detection signal is multiplied only needs to be calculated by dividing a value obtained by adding and subtracting coefficients of 2m-th order of the Fourier series expansions of the first detection signal and the second detection signal by a ky-th power of the fundamental wave amplitude.

Similarly, a gain $G_{2kx}$ by which kx-th power of the second detection signal is multiplied only needs to be calculated by dividing a value obtained by adding and subtracting coefficients of (2m+1)th order of the Fourier series expansions of the first detection signal and the second detection signal by a kx-th power of the fundamental wave amplitude. A gain $G_{2ky}$ by which ky-th power of the second detection signal is multiplied only needs to be calculated by dividing a value obtained by adding and subtracting coefficients of 2m-th order of the Fourier series expansions of the first detection signal and the second detection signal by a ky-th power of the fundamental wave amplitude.

Figure 5:
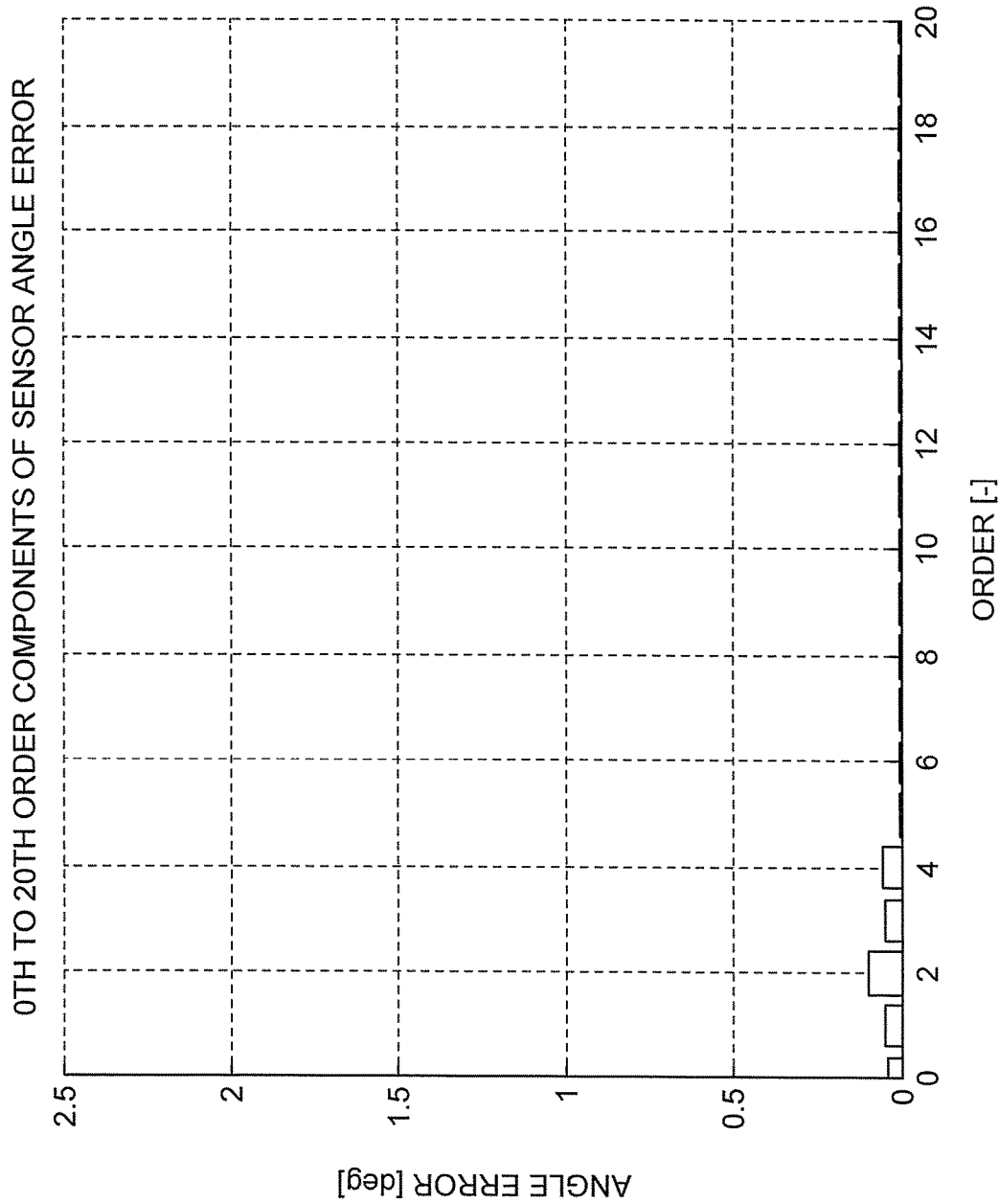
FIG. 5 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through a method of the first embodiment of the present invention.

FIG. 5 is a graph for showing angle errors remaining after the angle errors of the 1st order rotation generated by the offset errors and the angle errors of the 2nd order rotation generated by the amplitude ratio of the two signals, both of which are contained in the respective signals of FIG. 3, are corrected through the method of the first embodiment of the present invention. More specifically, FIG. 5 is a graph for showing angle errors remaining in the case where the correction is made by the correction signal calculator 2 in accordance with Expression (14).

As is apparent from a comparison between FIG. 4 and FIG. 5, in FIG. 5, the angle errors of the 1st order rotation and the 2nd order rotation remaining in FIG. 4 can be decreased by an effect of the correction of the first embodiment.

Figure 6:
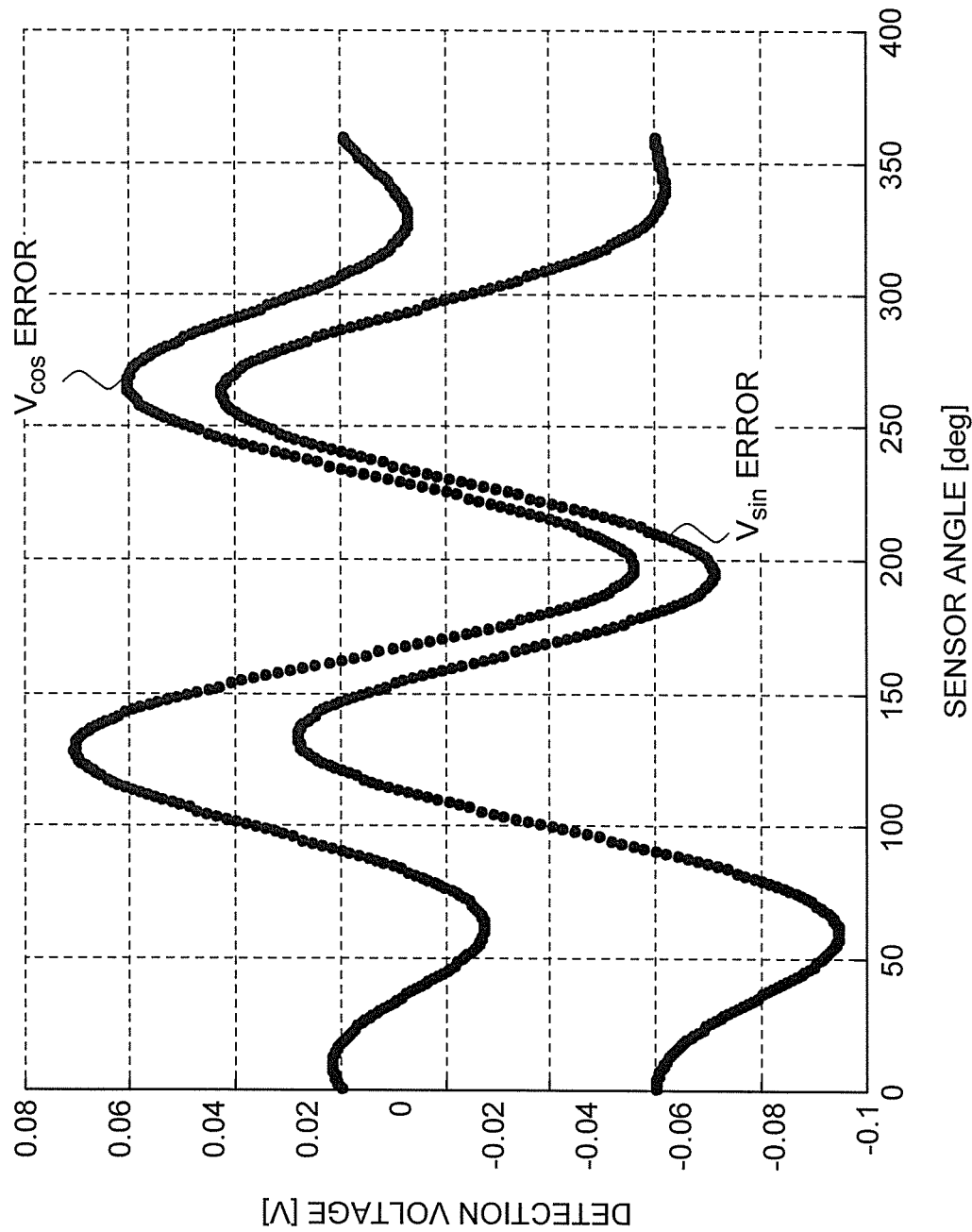
FIG. 6 is a graph for showing an example of error components that are contained in the respective signals and are different from those of FIG. 4 in the first embodiment of the present invention.

In FIG. 3, the angle error ε given by Expression (7), which is generated by the positional displacement and the axis displacement, is assumed. However, with the correction method of the first embodiment, the angle error ε can be decreased even in a case where signal errors of FIG. 6 are contained. FIG. 6 is a graph for showing an example of error components that are contained in the respective signals and are different from those of FIG. 4 in the first embodiment of the present invention.

Figure 7:
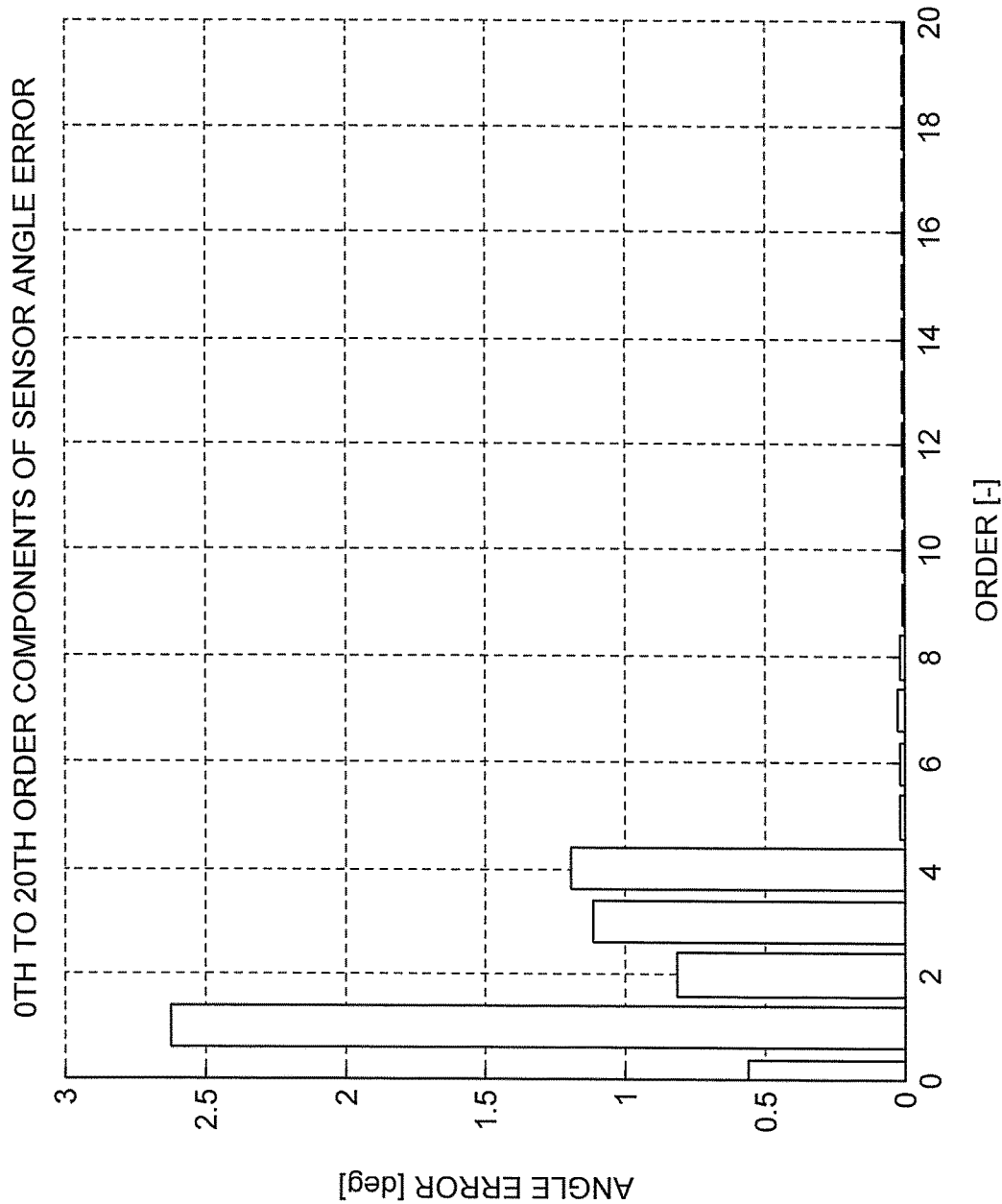
FIG. 7 is a graph for showing angle errors remaining after the angle errors contained in the respective signals of FIG. 6 are corrected through the method of Patent Literature 1.

FIG. 7 is a graph for showing angle errors remaining after the angle errors contained in the respective signals of FIG. 6 are corrected through the method of Patent Literature 1. As shown in FIG. 7, with the method of Patent Literature 1, angle errors of the 1st order rotation to a 4th order rotation are generated by the error components of the 1st order rotation to the 3rd order rotation contained in the signals.

Figure 8:
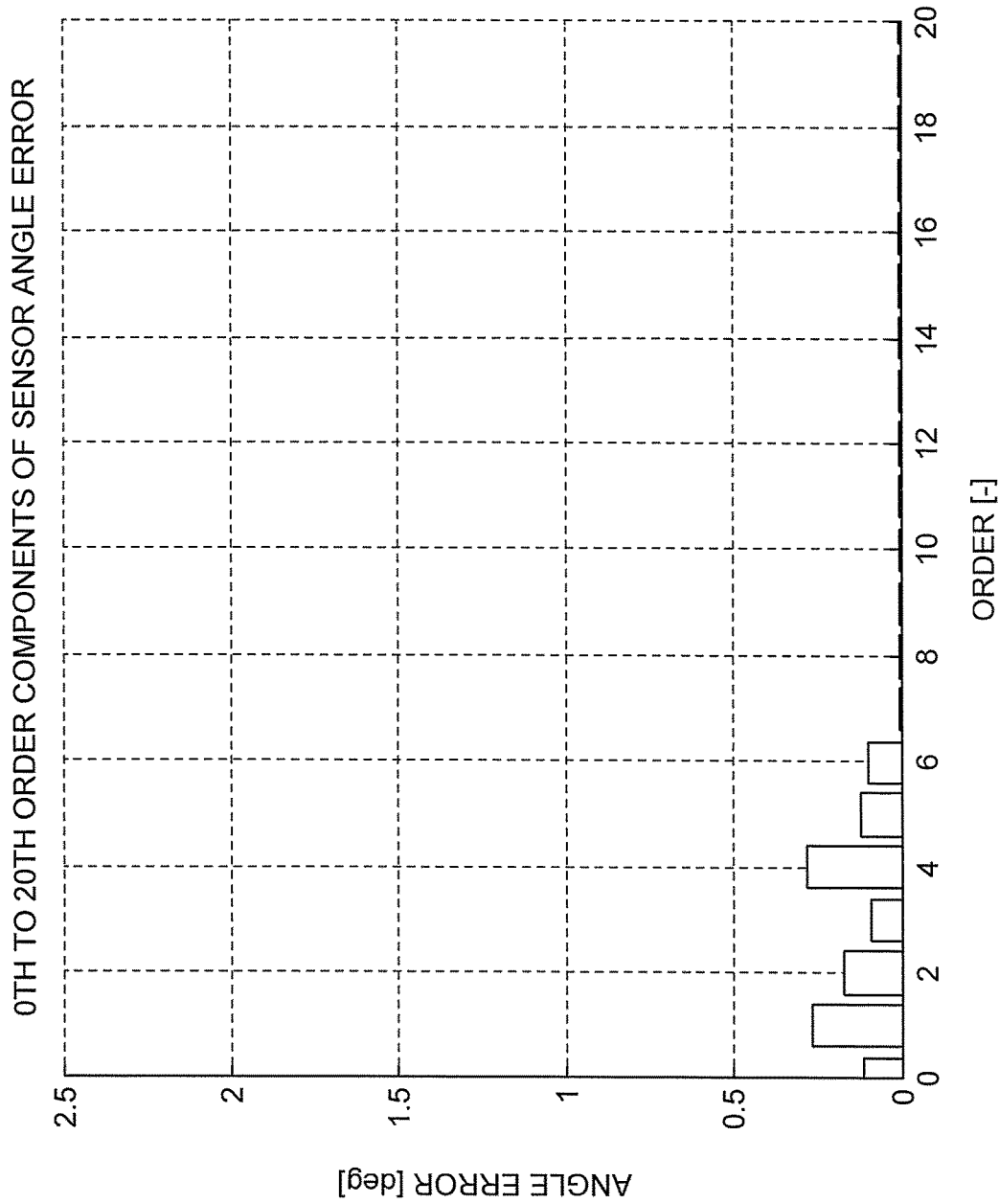
FIG. 8 is a graph for showing angle errors remaining after the angle errors contained in the respective signals of FIG. 6 are corrected through the method of the first embodiment.

Meanwhile, FIG. 8 is a graph for showing angle errors remaining after the angle errors contained in the respective signals of FIG. 6 are corrected through the method of the first embodiment of the present invention. More specifically, FIG. 8 is a graph for showing angle errors remaining in the case where the correction is made by the correction signal calculator 2 in accordance with Expression (14). In FIG. 8, it can be found that the angle errors of the 1st order rotation to the 4th order rotation remaining in FIG. 7 can be decreased through the effect of the correction of the first embodiment.

In other words, Expression (14) is also described as follows. The correction signal calculator 2 subtracts, from the first detection signal, a sum of at least one of the first offset correction value $X_0$, $X_1$ to $X_3$, which are obtained by multiplying 1st to 3rd powers of the first detection signal by $K_{11}$ to $K_{13}$, respectively, and $X_4$ to $X_6$, which are obtained by multiplying 1st to 3rd powers of the second detection signal by $K_{21}$ to $K_{23}$, respectively, to thereby calculate a corrected first detection signal.

Further, the correction signal calculator 2 subtracts, from the second detection signal, a sum of at least one of the second offset correction value $Y_0$, $Y_1$ to $Y_3$, which are obtained by multiplying 1st to 3rd powers of the first detection signal by $G_{11}$ to $G_{13}$, respectively, and $Y_4$ to $Y_6$, which are obtained by multiplying 1st to 3rd powers of the second detection signal by $G_{21}$ to $G_{23}$, respectively, to thereby calculate a corrected second detection signal.

Then, the angle calculator 3 calculates an angle signal for a rotary machine from the corrected first detection signal and the corrected second detection signal. As a result, the angle detection device according to the first embodiment can provide such an excellent effect that the errors in the 1st order component to the 4th-order component contained in the angle signal can be decreased, which is not provided by the related art.

A description has been given of the effect in the case where the 1st order to the 4th order angle errors are generated by the signals containing the 1st order to 3rd order errors. However, it should be understood that the same effect is provided even in a case where the 1st order to a (n+1)th order (n is a natural number of 2 or more) angle errors are generated by signals containing the 1st order to n-th order errors.

The sine signal $V_{sin}$ and the cosine signal $V_{cos}$ do not always refer to raw values detected by the angle detector 1. For example, when 2.5 V is the center in a range of from 0 V to 5 V, a value obtained by subtracting 2.5 V from the detected raw value only needs to be considered as the sine signal $V_{sin}$ or the cosine signal $V_{cos}$. It should be understood that processing of subtracting 2.5 V may be carried out in the correction signal calculator 2, and Expression (14) only needs to be relational expressions reflecting the offset of 2.5 V.

Moreover, the sine signal $V_{sin}$ and the cosine signal $V_{cos}$ may be signals that have undergone hardware or software filtering in order to decrease disturbance noises.

As described above, according to the first embodiment of the present invention, the corrected signals generated from the sine signal and the cosine signal acquired from the angle detector are used to calculate the angle. Specifically, the corrected signals are generated by correcting the error components contained in the sine signal and the cosine signal in accordance with the simple correction expressions each expressed as the sum of the terms each obtained by multiplying the n-th power of the sine signal or the cosine signal by the gain, and the angle is then calculated from the generated corrected signals. As a result, it is possible to provide the angle detection device capable of decreasing the angle errors including the 2nd order component of rotation without causing the increase in cost.

Second Embodiment

In a second embodiment of the present invention, a description is given of a case in which the correction processing is carried out through calculation different from that of the first embodiment by a correction signal calculator 2a in place of the correction signal calculator 2.

A description is now given of the correction signal calculator 2a configured to calculate the corrected sine signal and the corrected cosine signal in accordance with Expression (17) in a case where the sine signal is defined as the first detection signal and the cosine signal is defined as the second detection signal.

$$\begin{cases} V'_{cos} = G_1(V_{cos} - V_{cos\_ofs}) + G_2 V'_{sin} \\ V'_{sin} = V_{sin} - V_{sin\_ofs} \end{cases} \quad (17)$$

The angle error ε obtained when the signals containing the 0th to 3rd order components as given by Expression (9) are corrected in accordance with Expression (17) is given by Expression (18) as tang.

$$\tan\varepsilon \approx \qquad (18)$$
$$\frac{1}{2a_1}[\{-G_1 b_1 + c_1 - G_2 d_1\} + \{2(c_0 - V_{sin\_ofs}) + c_2 - G_1 b_2 - G_2 d_2\}$$
$$\cos\theta + \{-2G_1(a_0 - V_{cos\_ofs}) + G_1 a_2 + G_2 c_2 + d_2\}\sin\theta +$$
$$\{c_1 + G_1 b_1 + G_2 d_1 + c_3 - G_1 b_3 - G_2 d_3\}\cos 2\theta +$$
$$\{-G_1 a_1 - G_2 c_1 + d_1 + G_1 a_3 + G_2 c_3 + d_3\}\sin 2\theta +$$
$$\{G_1 b_2 + c_2 + G_2 d_2\}\cos 3\theta + \{-G_1 a_2 - G_2 c_2 + d_2\}\sin 3\theta +$$
$$\{G_1 b_3 + c_3 + G_2 d_3\}\cos 4\theta + \{-(1 + G_1)a_3 - G_2 c_3 + d_3\}\sin 4\theta]$$

The correction signal calculator 2a of the second embodiment determines correction coefficients so that Expression (19) holds true in consideration of the fact that the angle error generated by the positional displacement and the axis displacement of the angle detector 1 is given by Expression (7).

$$\begin{cases} 2(c_0 - V_{sin\_ofs}) + c_2 - G_1 b_2 - G_2 d_2 = 0 \\ -2G_1(a_0 - V_{cos\_ofs}) + G_1 a_2 + G_2 c_2 + d_2 = 0 \\ c_1 + G_1 b_1 + G_2 d_1 + c_3 - G_1 b_3 - G_2 d_3 = 0 \\ -G_1 a_1 - G_2 c_1 + d_1 + G_1 a_3 + G_1 a_3 + G_2 c_3 + d_3 = 0 \end{cases} \quad (19)$$

The correction signal calculator 2a only needs to calculate the respective correction coefficients in accordance with, for example, Expression (20).

$$\begin{cases} \begin{pmatrix} G_1 \\ G_2 \end{pmatrix} \approx \frac{1}{(a_1 - a_3)(d_1 - d_3)} \begin{pmatrix} d_1^2 \\ -a_1(c_1 + c_3) - d_1(b_1 - b_3) \end{pmatrix} \\ \begin{pmatrix} V_{cos\_ofs} \\ V_{sin\_ofs} \end{pmatrix} \approx \frac{1}{2}\begin{pmatrix} 2a_0 - a_2 - d_2 \\ 2c_0 + c_2 - b_2 \end{pmatrix} \end{cases} \quad (20)$$

Figure 9:
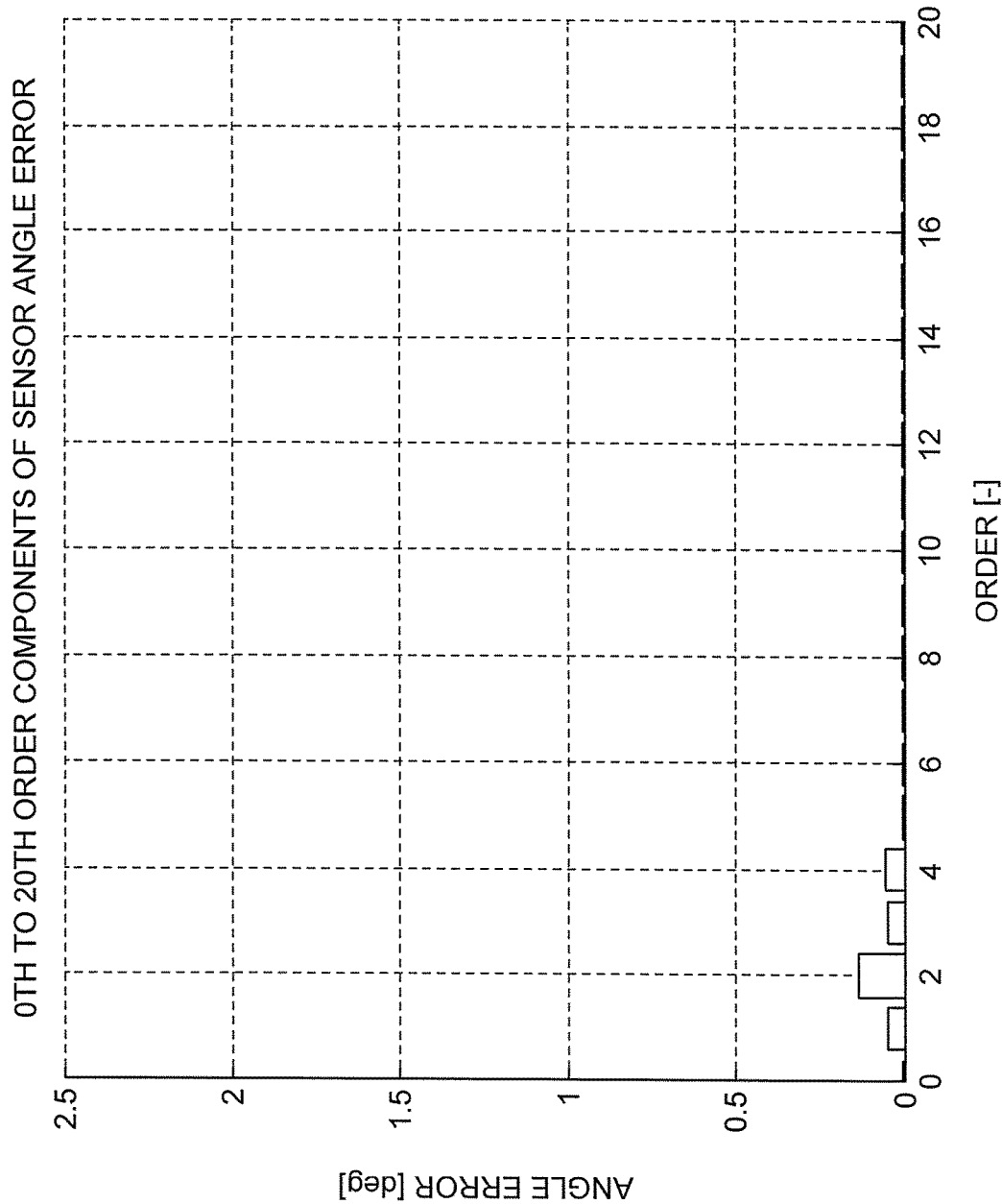
FIG. 9 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through first correction of a second embodiment of the present invention.

FIG. 9 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through first correction of the second embodiment of the present invention. More specifically, FIG. 9 is a graph for showing angle errors remaining in the case where the correction is made by the correction signal calculator 2a based on the correction coefficients defined in Expression (20).

As is apparent from a comparison between FIG. 4 and FIG. 9, in FIG. 9, the angle errors of the 1st order rotation and the 2nd order rotation remaining in FIG. 4 can be decreased by an effect of the first correction of the second embodiment.

In other words, Expression (17) is also described as follows. The correction signal calculator 2a subtracts the first offset correction value from the first detection signal, to thereby calculate the corrected first detection signal. Further, the correction signal calculator 2a adds a result of multiplication of the corrected first detection signal by a second gain to a result of multiplication of a result of subtraction of the second offset correction value from the second detection signal by a first gain, to thereby calculate a corrected second detection signal.

Then, the angle calculator 3 calculates an angle signal for a rotary machine from the corrected first detection signal and the corrected second detection signal. As a result, the angle detection device according to the second embodiment can provide such an excellent effect that the 1st order and 2nd order angle errors generated by the errors of the 0th order to 3rd order components contained in the sine signal or the cosine signal can be decreased, which is not provided by the related art.

Moreover, the correction signal calculator 2a may calculate the respective correction coefficients in accordance with, for example, Expression (21).

$$\begin{cases} \begin{pmatrix} G_1 \\ G_2 \end{pmatrix} \approx \frac{1}{a_1}\begin{pmatrix} a_3 + d_1 + d_3 \\ -(b_1 - b_3) - (c_1 + c_3) \end{pmatrix} \\ \begin{pmatrix} V_{cos\_ofs} \\ V_{sin\_ofs} \end{pmatrix} \approx \frac{1}{2}\begin{pmatrix} 2a_0 - a_2 - d_2 \\ 2c_0 + c_2 - b_2 \end{pmatrix} \end{cases} \quad (21)$$

Figure 10:
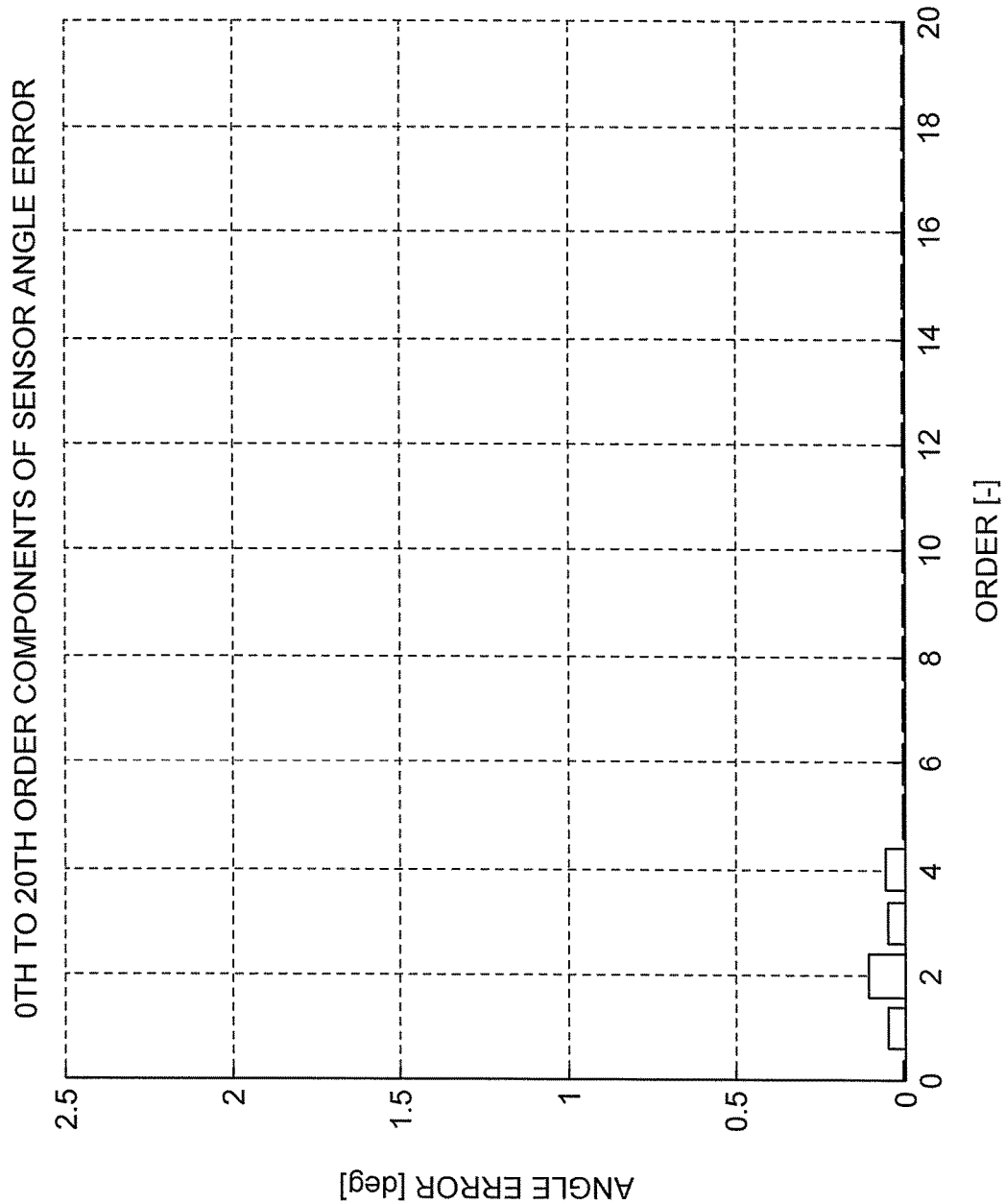
FIG. 10 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through second correction of the second embodiment of the present invention.

FIG. 10 is a graph for showing angle errors remaining after the angle errors of the 1st order rotation generated by the offset errors and the angle errors of the 2nd order rotation generated by the amplitude ratio of the two signals, both of which are contained in the respective signals of FIG. 3, are corrected through second correction of the second embodiment of the present invention. More specifically, FIG. 10 is a graph for showing angle errors remaining in the case where the correction is made by the correction signal calculator 2a based on the correction coefficients defined in Expression (21).

As is apparent from a comparison between FIG. 4 and FIG. 10, in FIG. 10, the angle errors of the 1st order rotation and the 2nd order rotation remaining in FIG. 4 can be decreased by an effect of the second correction of the second embodiment.

In the second correction, the approximation expressions given by Expression (21) are used in place of Expression (20). However, the approximation expressions are not limited to those given by Expression (21), and it should be understood that the same effect can be provided as long as the approximation is based on the same idea.

In other words, Expression (21) is also described as follows. The first gain can be obtained by dividing a result of addition or subtraction of the 1st order component of the first detection signal and the sum of the 3rd order components of the first detection signal and the second detection signal by the 1st order component of the second detection signal. Moreover, the second gain can be obtained by dividing a result of addition of values obtained by multiplying each of the 1st order component and the 3rd order component of the first detection signal and the 1st order component and the 3rd order component of the second detection signal by 1 or −1 by the 1st order component of the first detection signal or the second detection signal.

Moreover, the first offset correction value can be obtained by adding results obtained by multiplying each of the 0th order component and the 2nd order component of the first detection signal and the 2nd order component of the second detection signal by a coefficient to one another. Further, the second offset correction value can be obtained by adding results obtained by multiplying each of the 2nd order component of the first detection signal and the 0th order component and the 2nd order component of the second detection signal by a coefficient to one another.

As described above, according to the second embodiment, the corrected signals generated from the sine signal and the cosine signal acquired from the angle detector are used to calculate the angle. Specifically, the corrected signals are generated by correcting the error components contained in the sine signal and the cosine signal in accordance with the simple correction expressions expressed as the gains and the offsets defined by the coefficients of the sine signal and the cosine signal, and the angle is calculated from the generated corrected signals. As a result, it is possible to provide the angle detection device capable of decreasing the angle errors including the 2nd order component of rotation without causing the increase in cost.

Third Embodiment

In a third embodiment of the present invention, a description is given of a case in which the correction processing is carried out through calculation different from that of the first and the second embodiments by a correction signal calculator 2b in place of the correction signal calculator 2 or the correction signal calculator 2a.

A description is now given of the correction signal calculator 2b configured to calculate the corrected sine signal and the corrected cosine signal in accordance with Expression (22) in a case where the cosine signal is defined as the first detection signal and the sine signal is defined as the second detection signal.

$$\begin{cases} V'_{cos} = V_{cos} - V_{cos\_ofs} \\ V'_{sin} = G_1(V_{sin} - V_{sin\_ofs}) + G_2 V'_{cos} \end{cases} \quad (22)$$

The correction signal calculator 2b only needs to calculate the respective correction coefficients in accordance with, for example, Expression (23).

$$\begin{cases} \begin{pmatrix} G_1 \\ G_2 \end{pmatrix} \approx \frac{1}{(a_1 + a_3)(d_1 + d_3)}\begin{pmatrix} a_1^2 \\ -a_1(c_1 + c_3) - d_1(b_1 - b_3) \end{pmatrix} \\ \begin{pmatrix} V_{cos\_ofs} \\ V_{sin\_ofs} \end{pmatrix} \approx \frac{1}{2}\begin{pmatrix} 2a_0 - a_2 - d_2 \\ 2c_0 + c_2 - b_2 \end{pmatrix} \end{cases} \quad (23)$$

Figure 11:
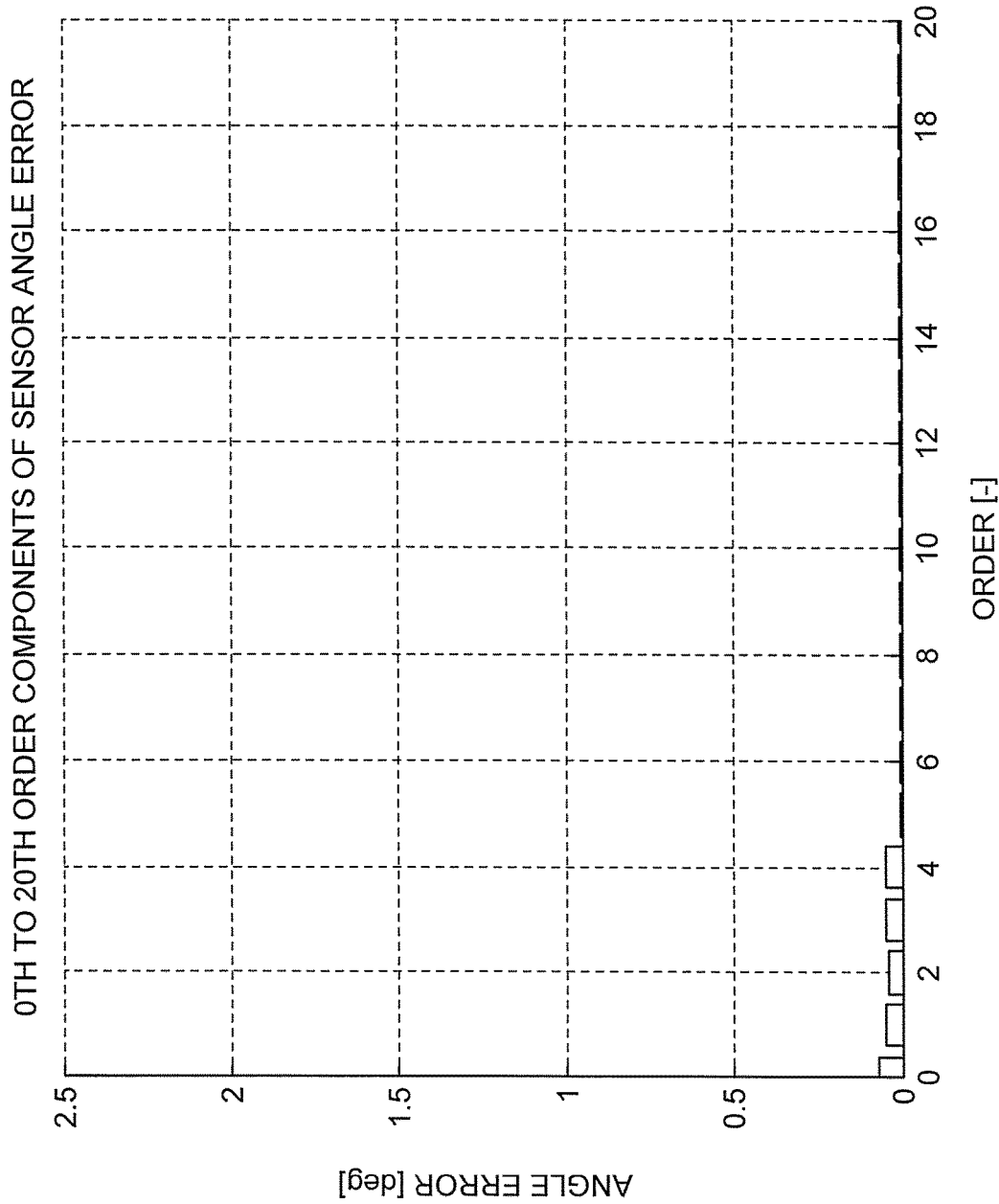
FIG. 11 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through first correction of a third embodiment of the present invention.

FIG. 11 is a graph for showing angle errors remaining after the angle errors of the 1st order rotation generated by the offset errors and the angle errors of the 2nd order rotation generated by the amplitude ratio of the two signals, both of which are contained in the respective signals of FIG. 3, are corrected through first correction of the third embodiment of the present invention. More specifically, FIG. 11 is a graph for showing angle errors remaining in the case where the correction is made by the correction signal calculator 2b based on the correction coefficients defined in Expression (23).

As is apparent from a comparison between FIG. 4 and FIG. 11, in FIG. 11, the angle errors of the 1st order rotation and the 2nd order rotation remaining in FIG. 4 can be decreased by an effect of the first correction of the third embodiment.

Moreover, the correction signal calculator 2b may calculate the respective correction coefficients in accordance with, for example, Expression (24).

$$\begin{cases} \begin{pmatrix} G_1 \\ G_2 \end{pmatrix} \approx \frac{1}{d_1} \begin{pmatrix} a_1 - a_3 - d_3 \\ -(b_1 - b_3) - (c_1 + c_3) \end{pmatrix} \\ \begin{pmatrix} V_{cos\_ofs} \\ V_{sin\_ofs} \end{pmatrix} \approx \frac{1}{2} \begin{pmatrix} 2a_0 - a_2 - d_2 \\ 2c_0 + c_2 - b_2 \end{pmatrix} \end{cases} \quad (24)$$

Figure 12:
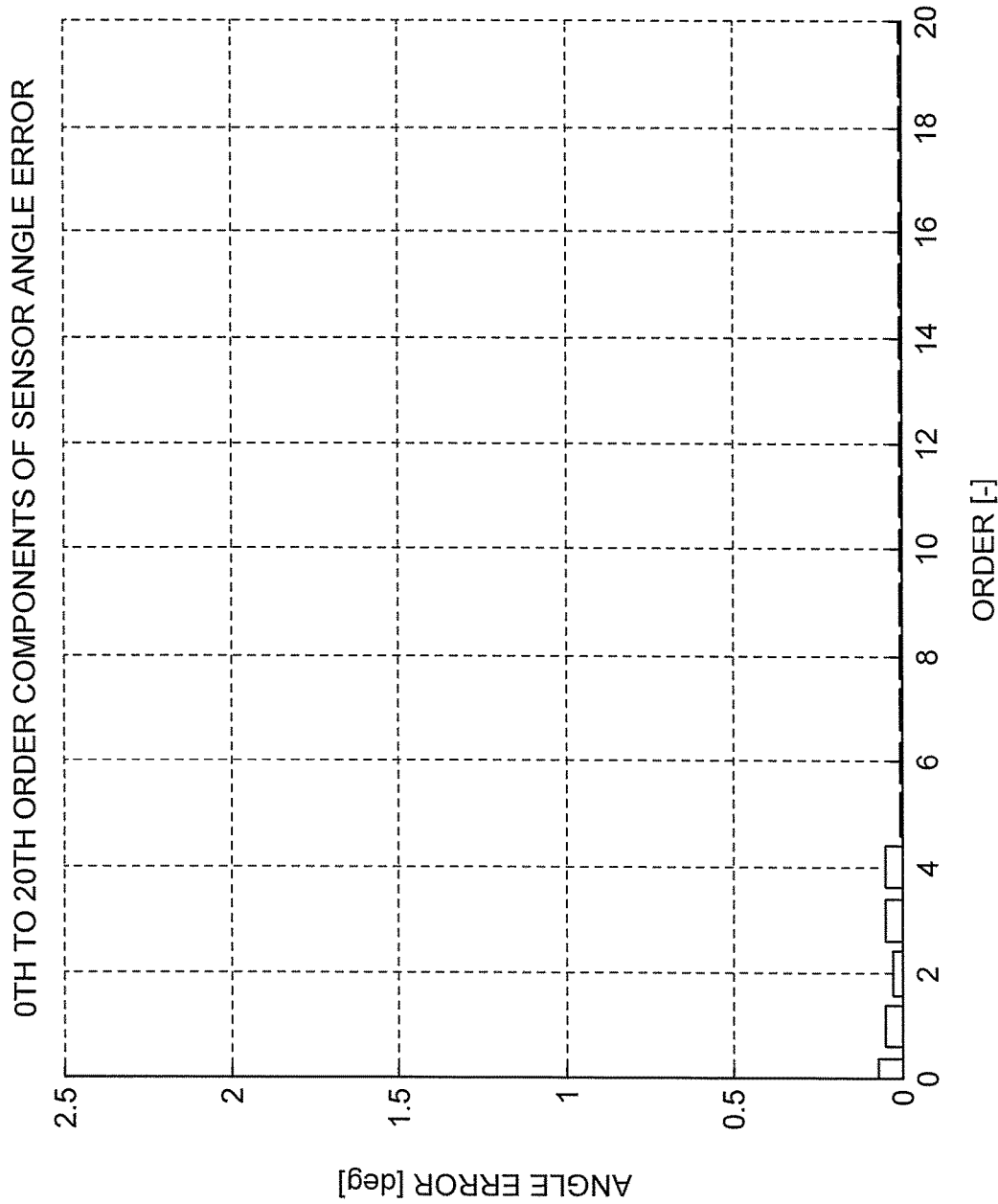
FIG. 12 is a graph for showing the angle errors remaining after the angle errors of rotation 1st order generated by the offset errors and the angle errors of rotation 2nd order generated by the amplitude ratio of the two signals, both of which are contained in the respective signals of FIG. 3, are corrected through second correction of the third embodiment of the present invention.

FIG. 12 is a graph for showing angle errors remaining after the angle errors of the 1st order rotation generated by the offset errors and the angle errors of the 2nd order rotation generated by the amplitude ratio of the two signals, both of which are contained in the respective signals of FIG. 3, are corrected through second correction of the third embodiment of the present invention. More specifically, FIG. 12 is a graph for showing angle errors remaining in the case where the correction is made by the correction signal calculator 2b based on the correction coefficients defined in Expression (24).

As is apparent from a comparison between FIG. 4 and FIG. 12, in FIG. 12, the angle errors of the 1st order rotation and the 2nd order rotation remaining in FIG. 4 can be decreased by an effect of the second correction of the third embodiment.

In the second correction, the approximation expressions given by Expression (24) are used in place of Expression (23). However, the approximation expressions are not limited to those given by Expression (24), and it should be understood that the same effect can be provided as long as the approximation is based on the same idea.

As described above, according to the third embodiment, the corrected signals generated from the sine signal and the cosine signal acquired from the angle detector are used to calculate the angle. Specifically, the corrected signals are generated by correcting the error components contained in the sine signal and the cosine signal in accordance with the simple correction expressions expressed as the gains and the offsets defined by the coefficients of the sine signal and the cosine signal, and the angle is calculated from the generated corrected signals. As a result, it is possible to provide the angle detection device capable of decreasing the angle errors including the 2nd order component of rotation without causing the increase in cost.

Fourth Embodiment

In a fourth embodiment of the present invention, a description is given of a case in which the correction processing is carried out through calculation different from that of the first to the third embodiments by a correction signal calculator 2c in place of the correction signal calculator 2, the correction signal calculator 2a, or the correction signal calculator 2b.

A description is now given of the correction signal calculator 2c configured to calculate the corrected sine signal and the corrected cosine signal in accordance with Expression (25) in a case where the sine signal is defined as the first detection signal and the cosine signal is defined as the second detection signal.

$$\begin{cases} V'_{cos} = (V_{cos} - V_{cos\_ofs}) + G_4 V'_{sin} \\ V'_{sin} = G_3 (V_{sin} - V_{sin\_ofs}) \end{cases} \quad (25)$$

The correction signal calculator 2c only needs to calculate the respective correction coefficients in accordance with, for example, Expression (26).

$$\begin{cases} \begin{pmatrix} G_3 \\ G_4 \end{pmatrix} \approx \frac{1}{(a_1 + a_3)(d_1 + d_3)} \begin{pmatrix} a_1^2 \\ -a_1(c_1 + c_3) - d_1(b_1 - b_3) \end{pmatrix} \\ \begin{pmatrix} V_{cos\_ofs} \\ V_{sin\_ofs} \end{pmatrix} \approx \frac{1}{2} \begin{pmatrix} 2a_0 - a_2 - d_2 \\ 2c_0 + c_2 - b_2 \end{pmatrix} \end{cases} \quad (26)$$

Figure 13:
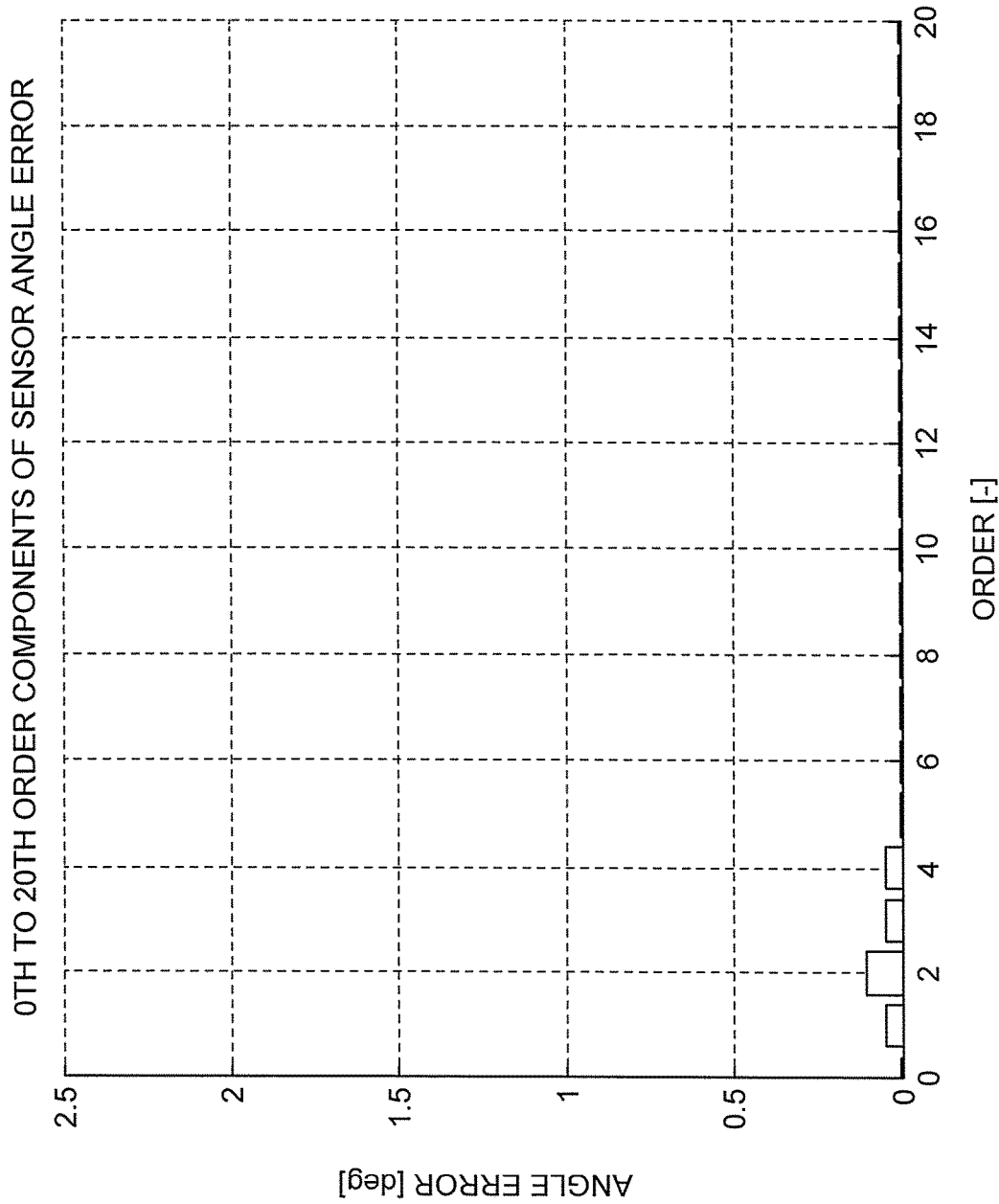
FIG. 13 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through first correction of a fourth embodiment of the present invention.

FIG. 13 is a graph for showing angle errors remaining after the angle errors of the 1st order rotation generated by the offset errors and the angle errors of the 2nd order rotation generated by the amplitude ratio of the two signals, both of which are contained in the respective signals of FIG. 3, are corrected through first correction of the fourth embodiment of the present invention. More specifically, FIG. 13 is a graph for showing angle errors remaining in the case where the correction is made by the correction signal calculator 2c based on the correction coefficients defined in Expression (26).

As is apparent from a comparison between FIG. 4 and FIG. 13, in FIG. 13, the angle errors of the 1st order rotation and the 2nd order rotation remaining in FIG. 4 can be decreased by an effect of the first correction of the fourth embodiment.

In other words, Expression (25) is also described as follows. The correction signal calculator 2c subtracts the first offset correction value from the first detection signal and multiplies the resultant by a third gain, to thereby calculate the corrected first detection signal. Further, the correction signal calculator 2c adds a result of multiplication of the corrected first detection signal by a fourth gain to a result of subtraction of the second offset correction value from the second detection signal, to thereby calculate a corrected second detection signal.

Then, the angle calculator 3 calculates an angle signal for a rotary machine from the corrected first detection signal and the corrected second detection signal. As a result, the angle detection device according to the fourth embodiment can provide such an excellent effect that the 1st order and 2nd order angle errors generated by the errors of the 0th order to 3rd order components contained in the sine signal or the cosine signal can be decreased, which is not provided by the related art.

Moreover, the correction signal calculator 2c may calculate the respective correction coefficients in accordance with, for example, Expression (27).

$$\begin{cases} \begin{pmatrix} G_3 \\ G_4 \end{pmatrix} \approx \frac{1}{d_1} \begin{pmatrix} a_1 - a_3 - d_3 \\ -(b_1 - b_3) - (c_1 + c_3) \end{pmatrix} \\ \begin{pmatrix} V_{cos\_ofs} \\ V_{sin\_ofs} \end{pmatrix} \approx \frac{1}{2} \begin{pmatrix} 2a_0 - a_2 - d_2 \\ 2c_0 + c_2 - b_2 \end{pmatrix} \end{cases} \quad (27)$$

Figure 14:
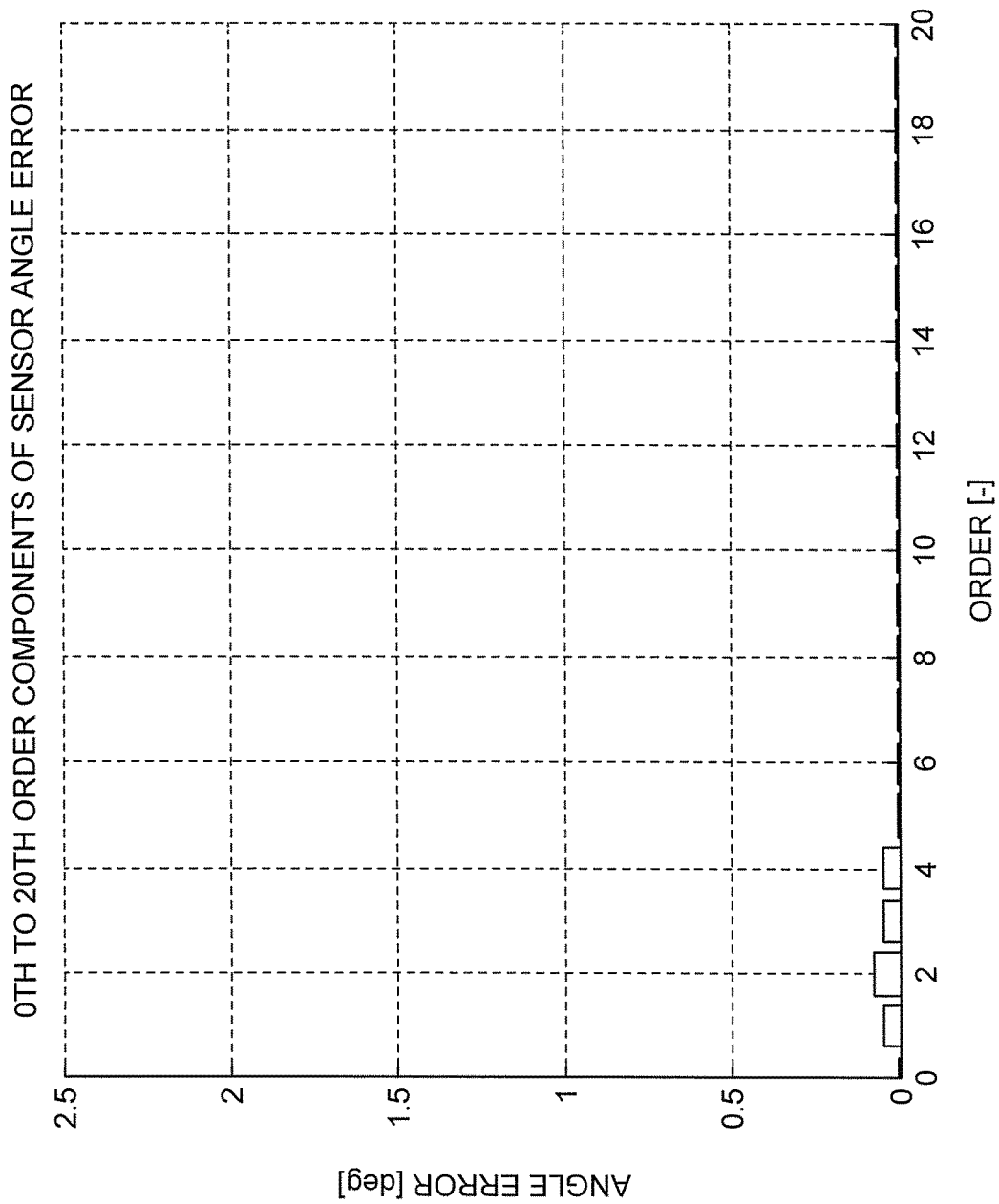
FIG. 14 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through second correction of the fourth embodiment of the present invention.

FIG. 14 is a graph for showing angle errors remaining after the angle errors of the 1st order rotation generated by the offset errors and the angle errors of the 2nd order rotation generated by the amplitude ratio of the two signals, both of which are contained in the respective signals of FIG. 3, are corrected through second correction of the fourth embodiment of the present invention. More specifically, FIG. 14 is a graph for showing angle errors remaining in the case where the correction is made by the correction signal calculator 2c based on the correction coefficients defined in Expression (27).

As is apparent from a comparison between FIG. 4 and FIG. 14, in FIG. 14, the angle errors of the 1st order rotation and the 2nd order rotation remaining in FIG. 4 can be decreased by an effect of the second correction of the fourth embodiment.

In the second correction, the approximation expressions given by Expression (27) are used in place of Expression (26). However, the approximation expressions are not limited to those given by Expression (27), and it should be understood that the same effect can be provided as long as the approximation is based on the same idea.

In other words, Expression (27) is also described as follows. The third gain can be obtained by dividing a result of addition or subtraction of the 1st order component of the first detection signal and the sum of the 3rd order components of the first detection signal and the second detection signal by the 1st order component of the second detection signal. Moreover, the fourth gain can be obtained by dividing a result of addition of values obtained by multiplying each of the 1st order component and the 3rd order component of the first detection signal and the 1st order component and the 3rd order component of the second detection signal by 1 or −1 by the 1st order component of the first detection signal or the second detection signal.

As described above, according to the fourth embodiment, the corrected signals generated from the sine signal and the cosine signal acquired from the angle detector are used to calculate the angle. Specifically, the corrected signals are generated by correcting the error components contained in the sine signal and the cosine signal in accordance with the simple correction expressions expressed as the gains and the offsets defined by the coefficients of the sine signal and the cosine signal, and the angle is calculated from the generated corrected signals. As a result, it is possible to provide the angle detection device capable of decreasing the angle errors including the 2nd order component of rotation without causing the increase in cost.

Fifth Embodiment

In a fifth embodiment of the present invention, a description is given of a case in which the correction processing is carried out through calculation different from that of the first to fourth embodiments by a correction signal calculator 2d in place of the correction signal calculator 2, the correction signal calculator 2a, the correction signal calculator 2b, or the correction signal calculator 2c.

A description is now given of the correction signal calculator 2d configured to calculate the corrected sine signal and the corrected cosine signal in accordance with Expression (28) in a case where the cosine signal is defined as the first detection signal and the sine signal is defined as the second detection signal.

$$\begin{cases} V'_{cos} = G_3(V_{cos} - V_{cos\_ofs}) \\ V'_{sin} = (V_{sin} - V_{sin\_ofs}) + G_4 V'_{sin} \end{cases} \quad (28)$$

The correction signal calculator 2d only needs to calculate the respective correction coefficients in accordance with, for example, Expression (29).

$$\begin{cases} \begin{pmatrix} G_1 \\ G_2 \end{pmatrix} \approx \frac{1}{(a_1 - a_3)(d_1 - d_3)} \begin{pmatrix} d_1^2 \\ -a_1(c_1 + c_3) - d_1(b_1 - b_3) \end{pmatrix} \\ \begin{pmatrix} V_{cos\_ofs} \\ V_{sin\_ofs} \end{pmatrix} \approx \frac{1}{2} \begin{pmatrix} 2a_0 - a_2 - d_2 \\ 2c_0 + c_2 - b_2 \end{pmatrix} \end{cases} \quad (29)$$

Figure 15:
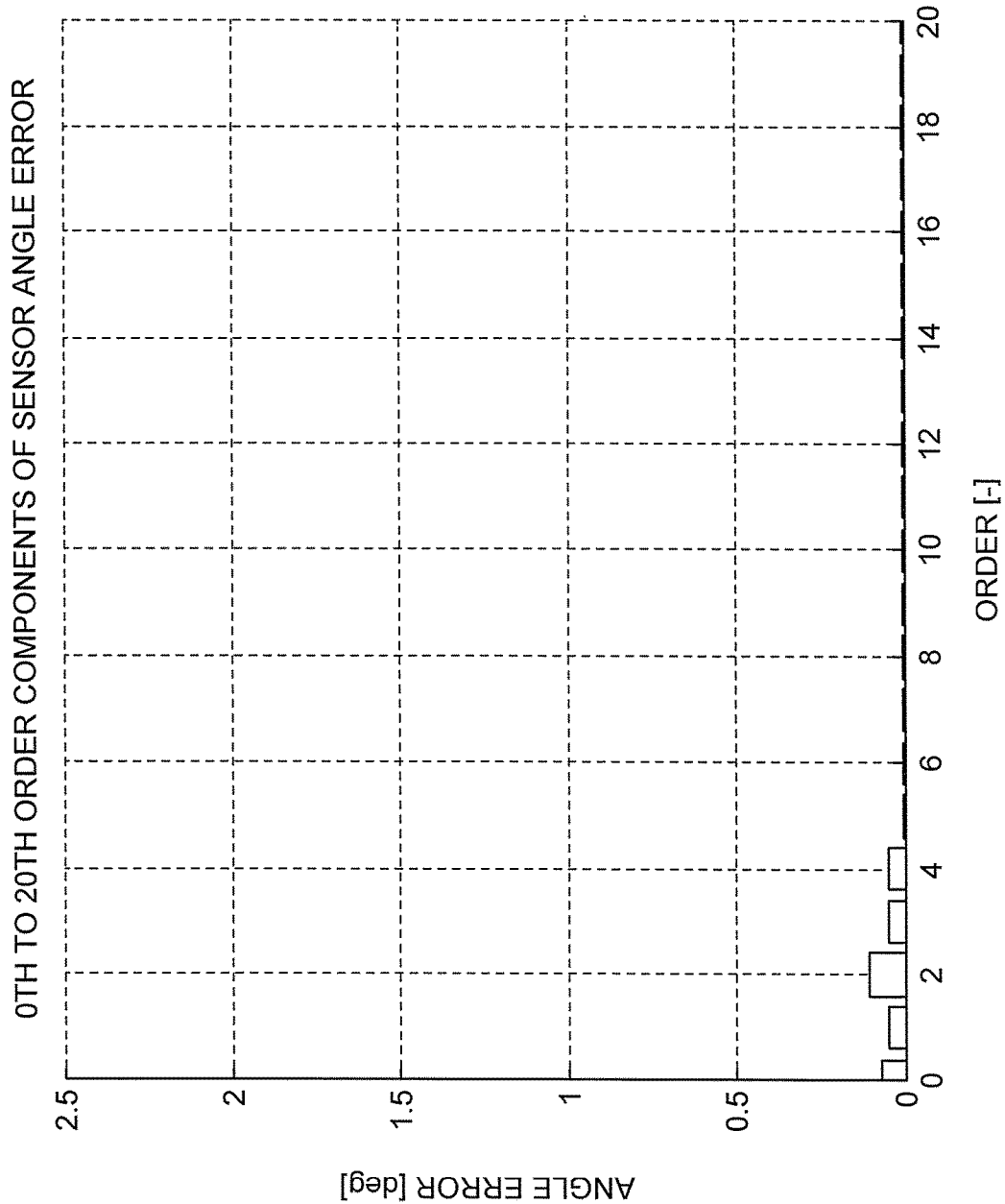
FIG. 15 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through first correction of a fifth embodiment of the present invention.

FIG. 15 is a graph for showing angle errors remaining after the angle errors of the 1st order rotation generated by the offset errors and the angle errors of the 2nd order rotation generated by the amplitude ratio of the two signals, both of which are contained in the respective signals of FIG. 3, are corrected through first correction of the fifth embodiment of the present invention. More specifically, FIG. 15 is a graph for showing angle errors remaining in the case where the correction is made by the correction signal calculator 2d based on the correction coefficients defined in Expression (29).

As is apparent from a comparison between FIG. 4 and FIG. 15, in FIG. 15, the angle errors of the 1st order rotation and the 2nd order rotation remaining in FIG. 4 can be decreased by an effect of the first correction of the fifth embodiment.

Moreover, the correction signal calculator 2d may calculate the respective correction coefficients in accordance with, for example, Expression (30).

$$\begin{cases} \begin{pmatrix} G_1 \\ G_2 \end{pmatrix} \approx \frac{1}{a_1} \begin{pmatrix} a_3 + d_1 + d_3 \\ -(b_1 - b_3) - (c_1 + c_3) \end{pmatrix} \\ \begin{pmatrix} V_{cos\_ofs} \\ V_{sin\_ofs} \end{pmatrix} \approx \frac{1}{2} \begin{pmatrix} 2a_0 - a_2 - d_2 \\ 2c_0 + c_2 - b_2 \end{pmatrix} \end{cases} \quad (30)$$

Figure 16:
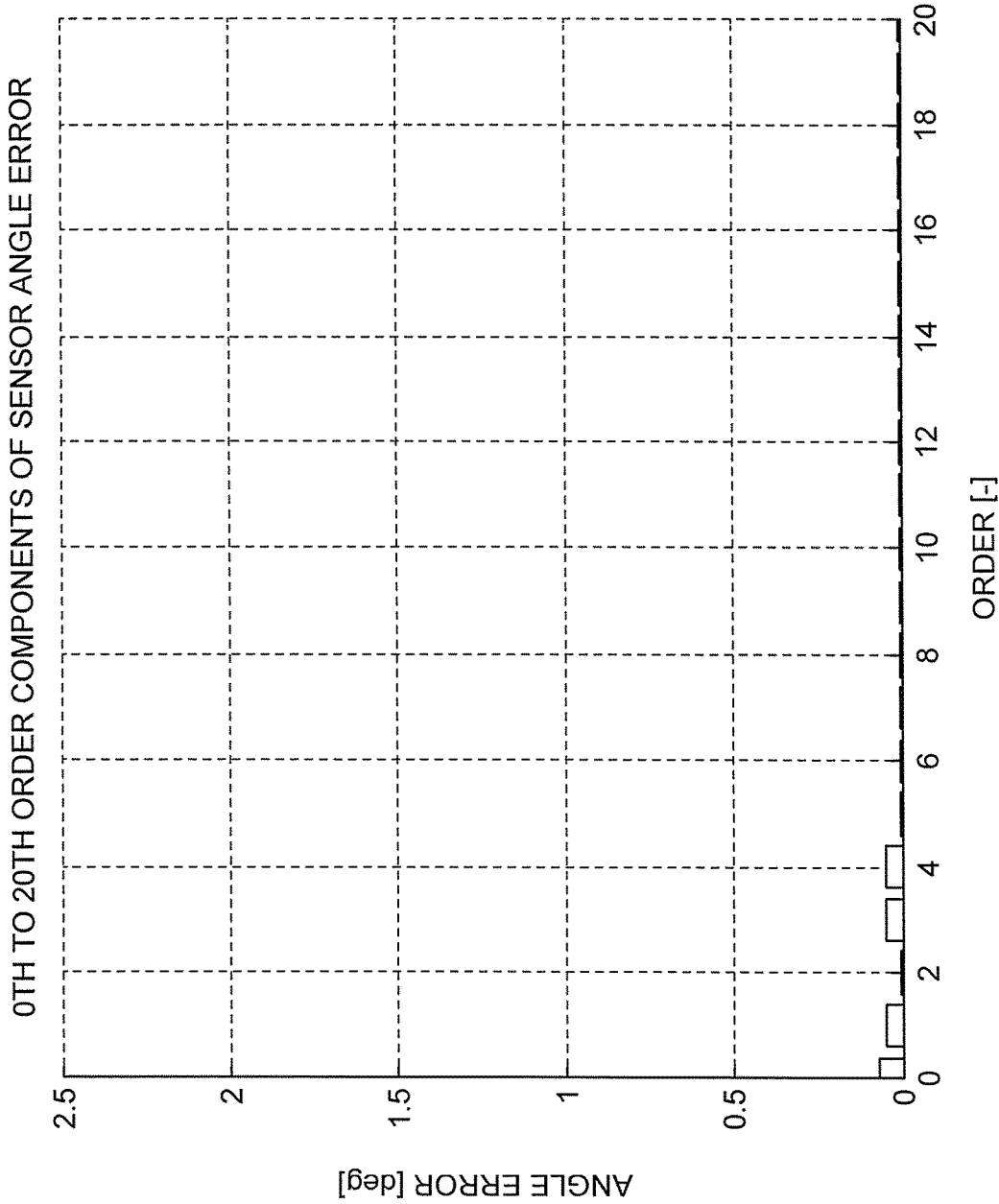
FIG. 16 is a graph for showing angle errors remaining after the angle errors of rotation 1st order generated by the offset errors and the angle errors of rotation 2nd order generated by the amplitude ratio of the two signals, both of which are contained in the respective signals of FIG. 3, are corrected through second correction of the fifth embodiment of the present invention.

FIG. 16 is a graph for showing angle errors remaining after the angle errors of the 1st order rotation generated by the offset errors and the angle errors of the 2nd order rotation generated by the amplitude ratio of the two signals, both of which are contained in the respective signals of FIG. 3, are corrected through second correction of the fifth embodiment of the present invention. More specifically, FIG. 16 is a graph for showing angle errors remaining in the case where the correction is made by the correction signal calculator 2d based on the correction coefficients defined in Expression (30).

As is apparent from a comparison between FIG. 4 and FIG. 16, in FIG. 16, the angle errors of the 1st order rotation and the 2nd order rotation remaining in FIG. 4 can be decreased by an effect of the second correction of the fifth embodiment.

In the second correction, the approximation expressions given by Expression (30) are used in place of Expression (29). However, the approximation expressions are not limited to those given by Expression (30), and it should be understood that the same effect can be provided as long as the approximation is based on the same idea.

As described above, according to the fifth embodiment, the corrected signals generated from the sine signal and the cosine signal acquired from the angle detector are used to calculate the angle. Specifically, the corrected signals are generated by correcting the error components contained in the sine signal and the cosine signal in accordance with the simple correction expressions expressed as the gains and the offsets defined by the coefficients of the sine signal and the cosine signal, and the angle is calculated from the generated corrected signals. As a result, it is possible to provide the angle detection device capable of decreasing the angle errors including the 2nd order component of rotation without causing the increase in cost.

Sixth Embodiment

In a sixth embodiment of the present invention, a description is given of a case in which the correction processing is carried out through calculation different from that of the first to fifth embodiments by a correction signal calculator $2e$ in place of the correction signal calculator $2$, the correction signal calculator $2a$, the correction signal calculator $2b$, the correction signal calculator $2c$, or the correction signal calculator $2d$.

In the first to fifth embodiment, a description is given of the methods of decreasing the 1st order to (n+1)th order (n is a natural number of 2 or more) angle errors generated by the signals containing the 1st order to n-th order errors. In contrast, in the sixth embodiment, a description is given of a method of decreasing the 1st order to (n+1)th order (n is a natural number of 2 or more) angle errors generated by signals containing the 1st order to (n+2)th order errors. For the sake of simple description, a case in which n=3 is described as an example, but the value of n is not limited to 3.

Figure 17:
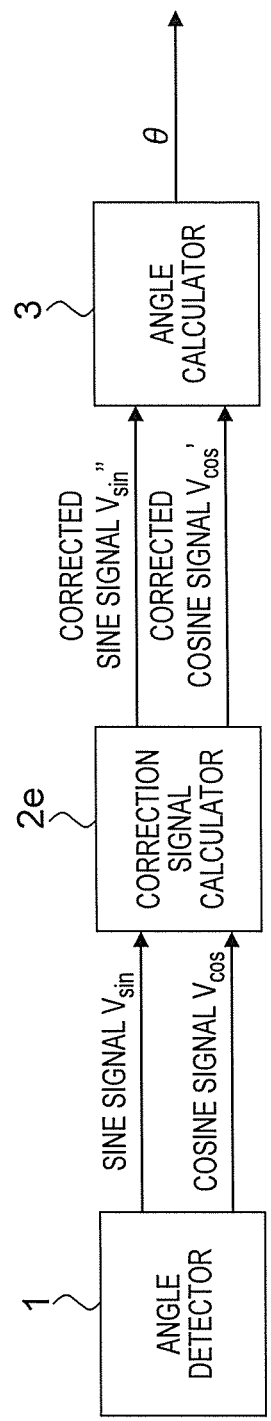
FIG. 17 is a block diagram for illustrating a configuration of an angle detection device according to a sixth embodiment of the present invention.
Figure 18:
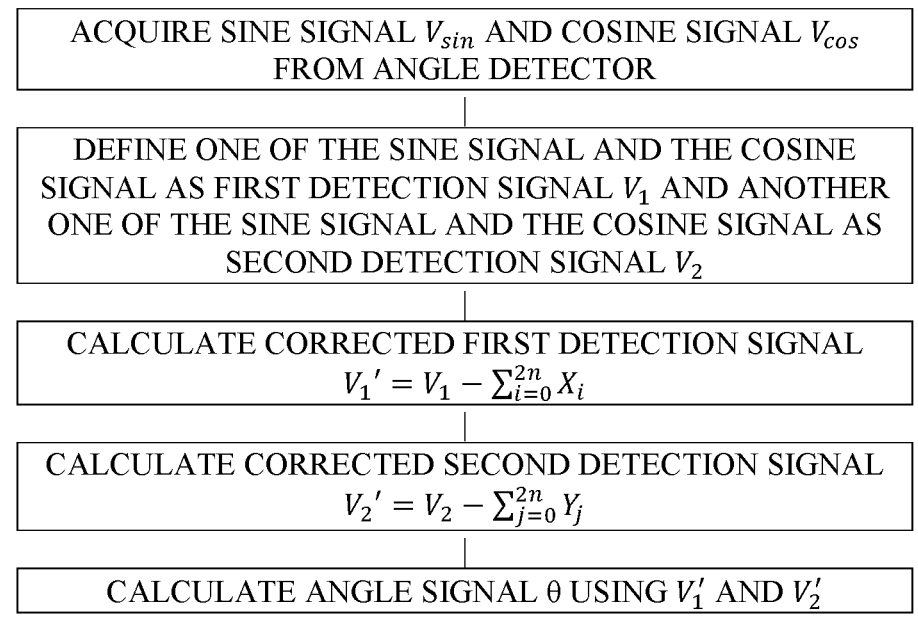
FIG. 18 is a diagram for illustrating an operation performed by the angle detection device according to an embodiment.

FIG. 17 is a block diagram for illustrating the configuration of an angle detection device according to the sixth embodiment of the present invention. The angle detection device according to the sixth embodiment illustrated in FIG. 17 includes the angle detector $1$, the correction signal calculator $2e$, and the angle calculator $3$.

The configuration of FIG. 17 of the sixth embodiment is substantially the same as the configuration of FIG. 2. The correction signal calculator $2$ of FIG. 2 outputs the corrected sine signal $V_{sin}'$ and the corrected cosine signal $V_{cos}'$. In contrast, the correction signal calculator $2e$ of FIG. 17 of the sixth embodiment outputs a corrected sine signal $V_{sin}''$ and the corrected cosine signal $V_{cos}'$, which is a difference from the configuration of the correction signal calculator $2$.

The cosine signal $V_{cos}$ and the sine signal $V_{sin}$ of the sixth embodiment are given by Expression (31).

$$\begin{cases} V_{cos} = a_0 + a_1\cos\theta + b_1\sin\theta + a_2\cos2\theta + \\ \qquad b_2\sin2\theta + a_3\cos3\theta + b_3\sin3\theta + \\ \qquad a_4\cos4\theta + b_4\sin4\theta + a_5\cos5\theta + b_5\sin5\theta \\ V_{sin} = c_0 + c_1\cos\theta + d_1\sin\theta + c_2\cos2\theta + \\ \qquad d_2\sin2\theta + c_3\cos3\theta + d_3\sin3\theta + \\ \qquad c_4\cos4\theta + d_4\sin4\theta + c_5\cos5\theta + d_5\sin5\theta \end{cases} \quad (31)$$

At this time, the corrected sine signal $V_{sin}''$ and the corrected cosine signal $V_{cos}'$ are calculated in accordance with Expression (32) and Expression (33). In this case, for example, k0 only needs to be given by $a_1/d_1$.

$$V_{sin}' = k_0 V_{sin} \quad (32)$$

$$\begin{cases} V_{cos}' = V_{cos} - k_{c0} - k_{c1}V_{cos} - k_{c3}V_{cos}^3 - k_{s1}V_{sin}' - k_{s2}V_{sin}'^2 - k_{s3}V_{sin}'^3 \\ V_{sin}'' = V_{sin}' - k_{s0} - k_{c2}V_{cos}^2 \end{cases} \quad (33)$$

The error components are sufficiently smaller than the fundamental wave components, and hence a relationship given by Expression (34) holds true for the respective coefficients of Expression (31). When the cosine signal $V_{cos}$ and the sine signal $V_{sin}$ are given as signals ranging from 0 V to 5 V centered around 2.5 V, it should be understood that signals from which 2.5 V is subtracted in advance only need to be used.

$$a_0, a_2, a_3, a_4, a_5, b_1, b_2, b_3, b_4, b_5, c_0, c_1, c_2, c_3, c_4, c_5, d_2, d_3, d_4, d_5 << a_1, d_1 \quad (34)$$

When the approximation is made based on assumption that products of three variables out of the variables other than $a_1$ and $d_1$ are negligible, Expression (35) to Expression (38) are provided.

$$k_{c2}V_{cos}^2 \approx k_{c2}a_1 \quad (35)$$
$$\left\{\frac{a_1}{2} + (2a_0 + a_2)\cos\theta + b_2\sin\theta + \left(\frac{a_1}{2} + a_3\right)\cos2\theta + (b_1 + b_3)\sin2\theta + \right.$$
$$(a_2 + a_4)\cos3\theta + (b_2 + b_4)\sin3\theta + (a_3 + a_5)\cos4\theta +$$
$$\left. (b_3 + b_5)\sin4\theta + a_4\cos5\theta + b_4\sin5\theta + a_5\cos6\theta + b_5\sin6\theta\right\}$$

$$k_{s2}V_{sin}'^2 \approx k_{s2}k_0^2 d_1 \quad (36)$$
$$\left\{\frac{d_1}{2} + d_2\cos\theta + (2c_0 - c_2)\sin\theta + \left(-\frac{d_1}{2} + d_3\right)\cos2\theta + (c_1 - c_3)\sin2\theta \right.$$
$$+ (-d_2 + d_4)\cos3\theta + (c_2 - c_4)\sin3\theta + (-d_3 + d_5)\cos4\theta +$$
$$\left. (c_3 - c_5)\sin4\theta - d_4\cos5\theta + c_4\sin5\theta - d_5\cos6\theta + c_5\sin6\theta\right\}$$

$$k_{c3}V_{cos}^3 \approx \frac{1}{4}k_{c3}a_1^2\{6a_0 + 3a_2 + (3a_1 + 3a_3)\cos\theta + \quad (37)$$
$$(3b_1 + 3b_3)\sin\theta + (6a_0 + 6a_2 + 3a_4)\cos2\theta +$$
$$(6b_2 + 3b_4)\sin2\theta + (a_1 + 6a_3 + 3a_5)\cos3\theta +$$
$$(3b_1 + 6b_3 + 3b_5)\sin3\theta + (3a_2 + 6a_4)\cos4\theta +$$
$$(3b_2 + 6b_4)\sin4\theta + (3a_3 + 6a_5)\cos5\theta + (3b_3 + 6b_5)\sin5\theta +$$
$$3a_4\cos6\theta + 3b_4\sin6\theta + 3a_5\cos7\theta + 3b_5\sin7\theta\}$$

$$k_{s3}V_{sin}'^3 \approx \frac{1}{4}k_{s3}k_0^3 d_1^2\{6c_0 - 3c_2 + (3c_1 - 3c_3)\cos\theta + \quad (38)$$
$$(3d_1 - 3d_3)\sin\theta + (-6c_0 + 6c_2 - 3c_4)\cos2\theta +$$
$$(6d_2 - 3d_4)\sin2\theta + (-3c_1 + 6c_3 - 3c_5)\cos3\theta +$$
$$(-d_1 + 6d_3 - 3d_5)\sin3\theta + (-3c_2 + 6c_4)\cos4\theta +$$
$$(-3d_2 + 6d_4)\sin4\theta + (-3c_3 + 6c_5)\cos5\theta + (-3d_3 + 6d_5)\sin5\theta -$$
$$3c_4\cos6\theta - 3d_4\sin6\theta - 3c_5\cos7\theta - 3d_5\sin7\theta\}$$

From Expression (35) to Expression (38), the corrected sine signal $V_{sin}''$ and the corrected cosine signal $V_{cos}'$ are given by Expression (39).

$$\begin{cases} V_{cos}' = A_0 + A_1\cos\theta + B_1\sin\theta + A_2\cos2\theta + \\ \qquad B_2\sin2\theta + A_3\cos3\theta + B_3\sin3\theta + \\ \qquad A_4\cos4\theta + B_4\sin4\theta + A_5\cos5\theta + \\ \qquad B_5\sin5\theta + A_6\cos6\theta + B_6\sin6\theta + A_7\cos7\theta + B_7\sin7\theta \\ V_{sin}'' = C_0 + C_1\cos\theta + D_1\sin\theta + C_2\cos2\theta + \\ \qquad D_2\sin2\theta + C_3\cos3\theta + D_3\sin3\theta + \\ \qquad C_4\cos4\theta + D_4\sin4\theta + C_5\cos5\theta + \\ \qquad D_5\sin5\theta + C_6\cos6\theta + D_6\sin6\theta + C_7\cos7\theta + D_7\sin7\theta \end{cases} \quad (39)$$

At this time, the angle error ε is given by Expression (40).

$$\varepsilon \approx \tan\varepsilon \approx \qquad (40)$$

$$\frac{1}{2A_1}\{(-B_1 + C_1) + (-B_2 + 2C_0 + C_2)\cos\theta + (-2A_0 + A_2 + d_2)\sin\theta +$$

$$(B_1 - B_3 + C_1 + C_3)\cos 2\theta + (-A_1 + A_3 + D_1 + D_3)\sin 2\theta +$$

$$(B_2 - B_4 + C_2 + C_4)\cos 3\theta + (-A_2 + A_4 + D_2 + D_4)\sin 3\theta +$$

$$(B_3 - B_4 + C_3 + C_5)\cos 4\theta + (-A_3 + A_5 + D_3 + D_5)\sin 4\theta +$$

$$(B_4 - B_6 + C_4 + C_6)\cos 5\theta + (-A_4 + A_6 + D_4 + D_6)\sin 5\theta +$$

$$(B_5 - B_7 + C_5 + C_7)\cos 6\theta + (-A_5 + A_7 + D_5 + D_7)\sin 6\theta +$$

$$(B_6 - B_6)\cos 7\theta + (-A_6 + D_6)\sin 7\theta +$$

$$(B_7 + C_7)\cos 8\theta + (-A_7 + D_7)\sin 8\theta\}$$

When simultaneous equations are solved so that respective 1st order to 4th order coefficients become zero in Expression (40), the eight correction coefficients $k_{c0}$ to $k_{c3}$ and $k_{s0}$ to $k_{s3}$ can consequently be calculated.

In other words, Expression (32) and Expression (33) are also described as follows. The correction signal calculator 2e subtracts, from the first detection signal, a sum of at least one of the first offset correction value $X_0$, $X_1$ to $X_3$, which are obtained by multiplying 1st to 3rd powers of the first detection signal by $K_{11}$ to $K_{13}$, respectively, and $X_4$ to $X_6$, which are obtained by multiplying 1st to 3rd powers of the second detection signal by $K_{21}$ to $K_{23}$, respectively, to thereby calculate a corrected first detection signal.

Further, the correction signal calculator 2e subtracts, from the second detection signal, a sum of at least one of the second offset correction value $Y_0$, $Y_1$ to $Y_3$, which are obtained by multiplying 1st to 3rd powers of the first detection signal by $G_{11}$ to $G_{13}$, respectively, and $Y_4$ to $Y_6$, which are obtained by multiplying 1st to 3rd powers of the second detection signal by $G_{21}$ to $G_{23}$, respectively, to thereby calculate a corrected second detection signal.

Then, the angle calculator 3 calculates an angle signal for a rotary machine from the corrected first detection signal and the corrected second detection signal. As a result, the angle detection device according to the sixth embodiment can provide such an excellent effect that the errors in the 1st order to 4th order components contained in the angle signal, which are generated by the 0th order to 5th order errors contained in the first detection signal and the second detection signal, can be decreased, which is not provided by the related art.

A description has been given of the effect in the case where the 1st order to 4th order angle errors are generated by the signals containing the 0th order to 5th order errors. However, it should be understood that the same effect is provided even in a case where 1st order to (n+1)th order (n is a natural number) angle errors are generated by signals containing the 0th order to (n+2)th order errors.

As described above, according to the sixth embodiment, the corrected signals generated from the sine signal and the cosine signal acquired from the angle detector are used to calculate the angle. Specifically, the corrected signals are generated by correcting the error components contained in the sine signal and the cosine signal in accordance with the simple correction expressions each expressed as the sum of the terms each obtained by multiplying the n-th power of the sine signal or the cosine signal by the gain, and the angle is then calculated from the generated corrected signals.

In particular, according to the sixth embodiment, the 1st order to n-th order errors, which are contained in the angle signal, and generated by the 0th order to (n+2)th order errors contained in the first detection signal and the second detection signal, can be decreased. As a result, it is possible to provide the angle detection device capable of decreasing the angle errors including the 2nd order component of rotation without causing the increase in cost.

Moreover, as in the first embodiment, the angle error ε is given by Expression (41) after the approximation in accordance with Expression (13). In Expression (41), the approximation is made based on an assumption that the products of the three minute coefficients are negligible, but it should be understood that other approximation provides the same effect.

$$\varepsilon \approx \frac{1}{2d_1}\left[\left\{-\left(b_1 + k_{s1} - \frac{3}{4}k_{s3}\right) + c_1\right\} + \right. \qquad (41)$$

$$\left\{-b_2 + \left(c_2 - \frac{k_{c2}}{2}\right) + 2\left(c_0 - k_{s0} - \frac{k_{c2}}{2}\right)\right\}\cos\theta +$$

$$\left\{-2\left(a_0 - k_{c0} - \frac{k_{s2}}{2}\right) + \left(a_2 + \frac{k_{s2}}{2}\right) + d_2\right\}\sin\theta +$$

$$\left\{\left(b_1 - k_{s1} - \frac{3}{4}k_{s3}\right) - \left(b_3 + \frac{k_{s3}}{4}\right) + c_1 + c_3\right\}\cos 2\theta +$$

$$\left\{-\left(a_1 - k_{c1} - \frac{3}{4}k_{c3}\right) + \left(a_3 - \frac{k_{c3}}{4}\right) + d_1 + d_3\right\}\sin 2\theta +$$

$$\left\{b_2 - b_4 + \left(c_2 - \frac{k_{c2}}{2}\right) + c_4\right\}\cos 3\theta +$$

$$\left\{-\left(a_2 + \frac{k_{s2}}{2}\right) + a_4 + d_2 + d_4\right\}\sin 3\theta +$$

$$\left\{\left(b_3 + \frac{k_{s3}}{4}\right) - b_5 + c_3 + c_5\right\}\cos 4\theta +$$

$$\left\{-\left(a_3 - \frac{k_{c3}}{4}\right) + a_5 + d_3 + d_5\right\}\sin 4\theta + (b_4 + c_4)\cos 5\theta +$$

$$\left. (-a_4 + d_4)\sin 5\theta + (b_5 + c_5)\cos 6\theta + (-a_5 + d_5)\sin 6\theta\right]$$

When simultaneous equations are solved so that respective 1st order to 4th order coefficients become zero in Expression (41), Expression (42) is obtained, and the eight correction coefficients $k_{c0}$ to $k_{c3}$ and $k_{s0}$ to $k_{s3}$ can consequently be calculated.

$$\begin{cases} k_{c0} = \dfrac{2a_0 + 2a_2 - 3a_4 - 4d_2 - 3d_4}{2} \\ k_{s0} = \dfrac{-4b_2 + 3b_4 + 2c_0 - 2c_2 - 3c_4}{2} \\ k_{c1} = a_1 - 3a_3 + 2a_5 - d_1 + d_3 + 2d_5 \\ k_{s1} = b_1 + 3b_3 - 4b_5 + c_1 + 5c_3 + 4c_4 \\ k_{c2} = 2b_2 - 2b_4 + 2c_2 + 2c_4 \\ k_{s2} = -2a_2 + 2a_4 + 2d_2 + 2d_4 \\ k_{c3} = 4a_3 - 4a_5 - 4d_3 - 4d_5 \\ k_{s3} = -4b_3 + 4b_5 - 4c_3 - 4c_5 \end{cases} \qquad (42)$$

That is, the first offset correction value $X_0$ only needs to be calculated by adding and subtracting coefficients of 2m-th order (m is an integer of 0 or more) of the Fourier series expansions of the first detection signal and the second detection signal.

Similarly, the second offset correction value $Y_0$ only needs to be calculated by adding and subtracting coefficients of 2m-th order of the Fourier series expansions of the first detection signal and the second detection signal.

The gain $G_{1kx}$ by which kx-th (kx is an odd number of 1 or more) power of the first detection signal is multiplied only needs to be calculated by dividing a value obtained by adding and subtracting coefficients of (2m+1)th order of the Fourier series expansions of the first detection signal and the second detection signal by a kx-th power of the fundamental wave amplitude.

In addition, the gain $G_{1ky}$ by which ky-th (ky is an even number of 1 or more) power of the first detection signal is multiplied only needs to be calculated by dividing a value obtained by adding and subtracting coefficients of 2m-th order of the Fourier series expansions of the first detection signal and the second detection signal by a ky-th power of the fundamental wave amplitude.

Similarly, the gain $G_{2kx}$ by which kx-th power of the second detection signal is multiplied only needs to be calculated by dividing a value obtained by adding and subtracting coefficients of (2m+1)th order of the Fourier series expansions of the first detection signal and the second detection signal by a kx-th power of the fundamental wave amplitude.

In addition, the gain $G_{2ky}$ by which ky-th power of the second detection signal is multiplied only needs to be calculated by dividing a value obtained by adding and subtracting coefficients of 2m-th order of the Fourier series expansions of the first detection signal and the second detection signal by a ky-th power of the fundamental wave amplitude.

The invention claimed is:

1. An angle detection device, comprising:
a correction signal calculator, which is configured to generate corrected signals from a sine signal and a cosine signal, which are acquired from an angle detector; and
an angle calculator, which is configured to calculate an angle signal for a rotary machine from the corrected signals generated by the correction signal calculator, wherein:
the correction signal calculator is configured to:
when one of the sine signal and the cosine signal is defined as a first detection signal, and another one of the sine signal and the cosine signal is defined as a second detection signal,
subtract, from the first detection signal, a sum of at least one of a first offset correction value $X_0$, $X_1$ to $X_n$, which are obtained by multiplying 1st to n-th powers of the first detection signal by $K_{11}$ to $K_{1n}$, respectively, where n is a natural number, and $X_{n+1}$ to $X_{2n}$, which are obtained by multiplying 1st to n-th powers of the second detection signal by $K_{21}$ to $K_{2n}$, respectively, to thereby calculate a corrected first detection signal; and
subtract, from the second detection signal, a sum of at least one of a second offset correction value $Y_0$, $Y_1$ to $Y_n$, which are obtained by multiplying 1st to n-th powers of the first detection signal by $G_{11}$ to $G_{1n}$, respectively, and $Y_{n+1}$ to $Y_{2n}$, which are obtained by multiplying 1st to n-th powers of the second detection signal by $G_{21}$ to $G_{2n}$, respectively, to thereby calculate a corrected second detection signal; and
the angle calculator is configured to calculate the angle signal for the rotary machine from the corrected first detection signal and the corrected second detection signal, to thereby decrease errors in 1st order to (n+1)th order components contained in the angle signal.

2. An angle detection device according to claim 1, wherein the angle calculator is configured to calculate the angle signal for the rotary machine from the corrected first detection signal and the corrected second detection signal, to thereby decrease errors in 1st order to (n+1)th order components contained in the angle signal, the errors being generated by 0th order to (n+2)th order errors contained in the first detection signal and the second detection signal.

3. An angle detection device according to claim 1, wherein the correction signal calculator is configured to calculate the first offset correction value $X_0$ by addition and subtraction of 2m-th order coefficients of Fourier series expansions of the first detection signal and the second detection signal, where m is an integer of 0 or more.

4. An angle detection device according to claim 1, wherein the correction signal calculator is configured to calculate the second offset correction value $Y_0$ by addition and subtraction of 2m-th order coefficients of Fourier series expansions of the first detection signal and the second detection signal, where m is an integer of 0 or more.

5. An angle detection device according to claim 1, wherein the correction signal calculator is configured to divide a value obtained by subtraction and addition of (2m+1)th order coefficients of Fourier series expansions of the first detection signal and the second detection signal by a kx-th power of a fundamental wave amplitude, to thereby calculate a gain $G_{1kx}$ by which a kx-th power of the first detection signal is to be multiplied, or divide a value obtained by subtraction and addition of 2m-th order coefficients of the Fourier series expansions of the first detection signal and the second detection signal by a ky-th power of a fundamental wave amplitude, to thereby calculate a gain $G_{1ky}$, by which a ky-th power of the first detection signal is to be multiplied, where kx is an odd number of 1 or more, ky is an even number of 1 or more, and m is an integer of 0 or more.

6. An angle detection device according to claim 1, wherein the correction signal calculator is configured to divide a value obtained by subtraction and addition of (2m+1)th order coefficients of Fourier series expansions of the first detection signal and the second detection signal by a kx-th power of a fundamental wave amplitude, to thereby calculate a gain $G_{2kx}$ by which a kx-th power of the second detection signal is to be multiplied, or divide a value obtained by subtraction and addition of 2m-th order coefficients of the Fourier series expansions of the first detection signal and the second detection signal by a ky-th power of a fundamental wave amplitude, to thereby calculate a gain $G_{2ky}$, by which a ky-th power of the second detection signal is to be multiplied, where kx is an odd number of 1 or more, ky is an even number of 1 or more, and m is an integer of 0 or more.

7. An angle detection device, comprising:
a correction signal calculator, which is configured to generate corrected signals from a sine signal and a cosine signal, which are acquired from an angle detector; and
an angle calculator, which is configured to calculate an angle signal for a rotary machine from the corrected signals generated by the correction signal calculator, wherein:

the correction signal calculator is configured to: when the cosine signal $V_{cos}$ is set as:

$$V_{cos}=a_0+a_1 \cos \theta+b_1 \sin \theta+a_2 \cos 2\theta+b_2 \sin 2\theta \ldots,$$

the sine signal $V_{sin}$ is set as:

$$V_{sin}=c_0+c_1 \cos \theta+d_1 \sin \theta+c_2 \cos 2\theta+d_2 \sin 2\theta \ldots,$$
and one of the sine signal and the cosine signal is defined as a first detection signal, and another one of the sine signal and the cosine signal is defined as a second detection signal,
  subtract a first offset correction value from the first detection signal, to thereby calculate a corrected first detection signal; and
  add a result of multiplication of the corrected first detection signal by a second gain to a result of multiplication of a result of subtraction of a second offset correction value from the second detection signal by a first gain, to thereby calculate a corrected second detection signal; and
  the angle calculator is configured to calculate the angle signal for the rotary machine from the corrected first detection signal and the corrected second detection signal, to thereby decrease 1st order and 2nd order angle errors generated from errors in 0th order to 3rd order components contained in the sine signal or the cosine signal.

8. An angle detection device according to claim 7, wherein the correction signal calculator is configured to divide a result of addition or subtraction of a 1st order component of the first detection signal and a sum of 3rd order components of the first detection signal and the second detection signal by a 1st order component of the second detection signal, to thereby calculate the first gain.

9. An angle detection device according to claim 7, wherein the correction signal calculator is configured to:
  calculate the first gain as $(a_3+d_1+d_3)/a_1$ when the first detection signal is the sine signal; and
  calculate the first gain as $(a_1-a_3-d_3)/d_1$ when the first detection signal is the cosine signal.

10. An angle detection device according to claim 7, wherein the correction signal calculator is configured to divide a result of addition of values obtained by multiplying each of a 1st order component and a 3rd order component of the first detection signal and a 1st order component and a 3rd order component of the second detection signal by 1 or −1 by the 1st order component of the first detection signal or the second detection signal, to thereby calculate the second gain.

11. An angle detection device according to claim 7, wherein the correction signal calculator is configured to calculate the second gain as $(-b_1+b_3-c_1-c_3)/a_1$ or $(-b_1+b_3-c_1-c_3)/d_1$.

12. An angle detection device, comprising:
  a correction signal calculator, which is configured to generate corrected signals from a sine signal and a cosine signal, which are acquired from an angle detector; and
  an angle calculator, which is configured to calculate an angle signal for a rotary machine from the corrected signals generated by the correction signal calculator, wherein:
  the correction signal calculator is configured to: when the cosine signal $V_{cos}$ is set as:

$$V_{cos}=a_0+a_1 \cos \theta+b_1 \sin \theta+a_2 \cos 2\theta+b_2 \sin 2\theta \ldots,$$

the sine signal $V_{sin}$ is set as:

$$V_{sin}=c_0+c_1 \cos \theta+d_1 \sin \theta+c_2 \cos 2\theta+d_2 \sin 2\theta \ldots,$$
and one of the sine signal and the cosine signal is defined as a first detection signal, and another one of the sine signal and the cosine signal is defined as a second detection signal,
  subtract a first offset correction value from the first detection signal and multiply a result of the subtraction by a third gain, to thereby calculate a corrected first detection signal; and
  add a result of multiplication of the corrected first detection signal by a fourth gain to a result of subtraction of a second offset correction value from the second detection signal, to thereby calculate a corrected second detection signal; and
  the angle calculator is configured to calculate the angle signal for the rotary machine from the corrected first detection signal and the corrected second detection signal, to thereby decrease 1st order and 2nd order angle errors generated from errors in 0th order to 3rd order components contained in the sine signal or the cosine signal.

13. An angle detection device according to claim 12, wherein the angle correction signal calculator is configured to divide a result of addition or subtraction of a 1st order component of the second detection signal and a sum of 3rd order components of the first detection signal and the second detection signal by the 1st order component of the second detection signal, to thereby calculate the third gain.

14. An angle detection device according to claim 12, wherein the angle correction signal calculator is configured to:
  calculate the third gain as $(a_1-a_3-d_3)/d_1$ when the first detection signal is the sine signal; and
  calculate the third gain as $(a_3+d_1+d_3)/a_1$ when the first detection signal is the cosine signal.

15. An angle detection device according to claim 12, wherein the angle correction signal calculator is configured to divide a result of addition of values obtained by multiplying each of a 1st order component and a 3rd order component of the first detection signal and a 1st order component and a 3rd order component of the second detection signal by 1 or −1 by the 1st order component of the first detection signal or the second detection signal, to thereby calculate the fourth gain.

16. An angle detection device according to claim 12, wherein the angle correction signal calculator is configured to calculate the fourth gain as $(-b_1+b_3-c_1-c_3)/a_1$.

17. An angle detection device according to claim 7, wherein the angle calculator is configured to add results obtained by multiplying each of a 0th order component and a 2nd order component of the first detection signal and a 2nd order component of the second detection signal by a coefficient to one another, to thereby calculate the first offset correction value.

18. An angle detection device according to claim 7, wherein the angle calculator is configured to add results obtained by multiplying each of a 2nd order component of the first detection signal and a 0th order component and a 2nd order component of the second detection signal by a coefficient to one another, to thereby calculate the second offset correction value.

19. An angle detection device according to claim 7, wherein the angle correction signal calculator is configured to:
  calculate the first offset correction value as $(2a_0-a_2-d_2)/2$ when the first detection signal is the cosine signal; and calculate the first offset correction value as $(2c_0-b_2+c_2)/2$ when the first detection signal is the sine signal.

20. An angle detection device according to claim 7, wherein the angle correction signal calculator is configured to:
   calculate the second offset correction value as $(2c_0-b_2+c_2)/2$ when the first detection signal is the cosine signal; and
   calculate the second offset correction value as $(2a_0-a_2-d_2)/2$ when the first detection signal is the sine signal.

21. An angle detection device according to claim 1, wherein the angle detector includes any one of a resolver, a sensor that uses a magnetic resistance, an encoder, and a Hall element.

* * * * *